(12) United States Patent
Campero et al.

(10) Patent No.: US 7,656,858 B2
(45) Date of Patent: Feb. 2, 2010

(54) APPARATUS FOR AND METHOD OF USING AN INTELLIGENT NETWORK AND RFID SIGNAL ROUTER

(75) Inventors: Richard J. Campero, San Clemente, CA (US); Thomas Cocotis, San Diego, CA (US); Steve Trivelpiece, Irvine, CA (US); Tim V. Kaenel, Coto De Caza, CA (US)

(73) Assignee: Sensormatic Electronics, LLC., Boca Raton, FL (US)

( * ) Notice: Subject to any disclaimer, the term of this patent is extended or adjusted under 35 U.S.C. 154(b) by 497 days.

(21) Appl. No.: 11/366,664

(22) Filed: Mar. 3, 2006

(65) Prior Publication Data

US 2006/0220862 A1    Oct. 5, 2006

Related U.S. Application Data

(60) Provisional application No. 60/673,757, filed on Apr. 22, 2005, provisional application No. 60/657,709, filed on Mar. 3, 2005.

(51) Int. Cl.
*H04L 12/28* (2006.01)
*H04L 12/56* (2006.01)

(52) U.S. Cl. .................................... 370/351; 370/396

(58) Field of Classification Search .......... 370/328–338
See application file for complete search history.

(56) References Cited

U.S. PATENT DOCUMENTS 4,375,642 A    3/1983    Dorrie et al.
4,560,978 A    12/1985   Lemelson
4,694,283 A    9/1987    Reeb
4,703,327 A    10/1987   Rossetti et al.
4,827,395 A    5/1989    Anders et al.
5,136,719 A    8/1992    Gaskill et al.

(Continued)

FOREIGN PATENT DOCUMENTS

EP    1185953    11/2000

(Continued)

OTHER PUBLICATIONS

Sorrells, Pete, "Passive RFID Basics", Microchip Technology, Inc., 1998, pp. 1-7; USA.

*Primary Examiner*—Chirag G Shah
*Assistant Examiner*—Amarnauth Persaud
(74) *Attorney, Agent, or Firm*—Pillsbury Winthrop Shaw Pittman LLP

(57) ABSTRACT

Apparatuses, systems for, and methods of transporting digital signals and radio-frequency ("RF") signals are disclosed. In accordance with a preferred embodiment of the invention, an intelligent network (e.g., a combination router) and corresponding method are provided for transporting RF signals to, for example, an RFID antenna and transporting digital signals to, for example, a controller. In a preferred embodiment, the intelligent network is implemented with a manager unit for controlling a plurality of network devices to facilitate the efficient management of RFID-enabled devices. The network devices may include a combination router/switch, which has the capability of switching both digital data and RF data, RFID readers, RFID reader/writer pads, and other devices. In accordance with preferred embodiments, the intelligent network allows enhanced flexibility in controlling systems for interrogation of RFID antennae.

22 Claims, 25 Drawing Sheets

U.S. PATENT DOCUMENTS

| | | | |
|---|---|---|---|
| 5,268,695 A | 12/1993 | Dentinger et al. | |
| 5,347,280 A | 9/1994 | Schuermann | |
| 5,406,297 A | 4/1995 | Caswell et al. | |
| 5,434,775 A | 7/1995 | Sims et al. | |
| 5,461,385 A | 10/1995 | Armstrong | |
| 5,517,620 A | 5/1996 | Hashimoto et al. | |
| 5,602,556 A | 2/1997 | Bowers | |
| 5,629,981 A | 5/1997 | Nerlikar | |
| 5,640,002 A | 6/1997 | Ruppert et al. | |
| 5,661,457 A | 8/1997 | Ghaffari et al. | |
| 5,727,153 A | 3/1998 | Powell | |
| 5,729,236 A | 3/1998 | Flaxl | |
| 5,751,220 A | 5/1998 | Ghaffari | |
| 5,751,256 A | 5/1998 | McDonough et al. | |
| 5,777,561 A | 7/1998 | Chieu et al. | |
| 5,786,763 A | 7/1998 | Canipe | |
| 5,798,693 A | 8/1998 | Engellenner | |
| 5,800,724 A | 9/1998 | Habeger et al. | |
| 5,825,814 A | 10/1998 | Detwiler et al. | |
| 5,884,278 A | 3/1999 | Powell | |
| 5,902,437 A | 5/1999 | McDonough et al. | |
| 5,949,335 A * | 9/1999 | Maynard | 340/572.1 |
| 5,963,173 A | 10/1999 | Lian et al. | |
| 6,002,344 A | 12/1999 | Bandy et al. | |
| 6,037,879 A | 3/2000 | Tuttle | |
| 6,046,683 A | 4/2000 | Pidwerbetsky et al. | |
| 6,055,509 A | 4/2000 | Powell et al. | |
| 6,057,756 A | 5/2000 | Engellenner | |
| 6,058,374 A | 5/2000 | Guthrie et al. | |
| 6,069,564 A | 5/2000 | Monahan et al. | |
| 6,094,173 A | 7/2000 | Nylander | |
| 6,105,002 A | 8/2000 | Powell | |
| 6,112,988 A | 9/2000 | Powell et al. | |
| 6,137,447 A | 10/2000 | Saitoh et al. | |
| 6,150,921 A | 11/2000 | Werb et al. | |
| 6,154,137 A | 11/2000 | Goff et al. | |
| 6,166,706 A | 12/2000 | Gallagher, III et al. | |
| 6,172,596 B1 | 1/2001 | Smyczynski et al. | |
| 6,173,891 B1 | 1/2001 | Powell | |
| 6,204,764 B1 | 3/2001 | Maloney | |
| 6,259,991 B1 | 7/2001 | Nysen | |
| 6,286,762 B1 | 9/2001 | Bodnar et al. | |
| 6,317,650 B1 | 11/2001 | Hintz et al. | |
| 6,320,556 B1 | 11/2001 | Cyman et al. | |
| 6,335,686 B1 | 1/2002 | Goff et al. | |
| 6,339,762 B1 | 1/2002 | Powell | |
| 6,341,269 B1 | 1/2002 | Dulaney et al. | |
| 6,351,215 B2 | 2/2002 | Rodgers et al. | |
| 6,354,495 B1 | 3/2002 | Powell et al. | |
| 6,395,373 B2 | 5/2002 | Conti et al. | |
| 6,398,105 B2 | 6/2002 | Katsandres et al. | |
| 6,400,272 B1 | 6/2002 | Holtzman et al. | |
| 6,462,656 B2 | 10/2002 | Ulrich et al. | |
| 6,600,418 B2 | 7/2003 | Francis et al. | |
| 6,600,420 B2 | 7/2003 | Gonzalez et al. | |
| 6,686,830 B1 | 2/2004 | Schirtzer | |
| 6,714,121 B1 | 3/2004 | Moore | |
| 6,747,560 B2 | 6/2004 | Stevens | |
| 7,145,437 B2 * | 12/2006 | Jalkanen et al. | 340/10.3 |
| 2001/0006368 A1 | 7/2001 | Maloney | |
| 2001/0054082 A1 | 12/2001 | Rudolph et al. | |
| 2002/0013831 A1 | 1/2002 | Astala et al. | |
| 2002/0016829 A1 * | 2/2002 | Defosse | 709/217 |
| 2002/0038267 A1 | 3/2002 | Turner et al. | |
| 2002/0041233 A1 | 4/2002 | Nicholson | |
| 2002/0044096 A1 | 4/2002 | Chung | |
| 2002/0149481 A1 | 10/2002 | Shanks et al. | |
| 2006/0143439 A1 * | 6/2006 | Arumugam et al. | 713/153 |

FOREIGN PATENT DOCUMENTS

| | | |
|---|---|---|
| WO | WO 00/43803 | 7/2000 |
| WO | WO 0201467 A2 | 1/2002 |

\* cited by examiner

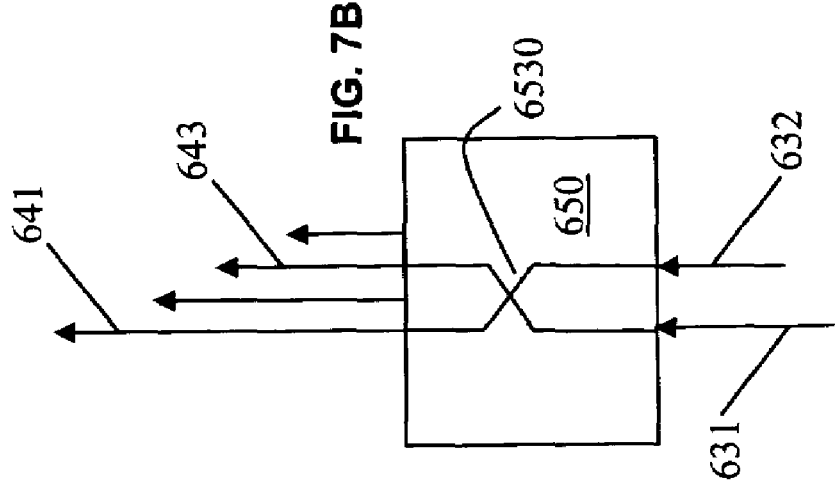
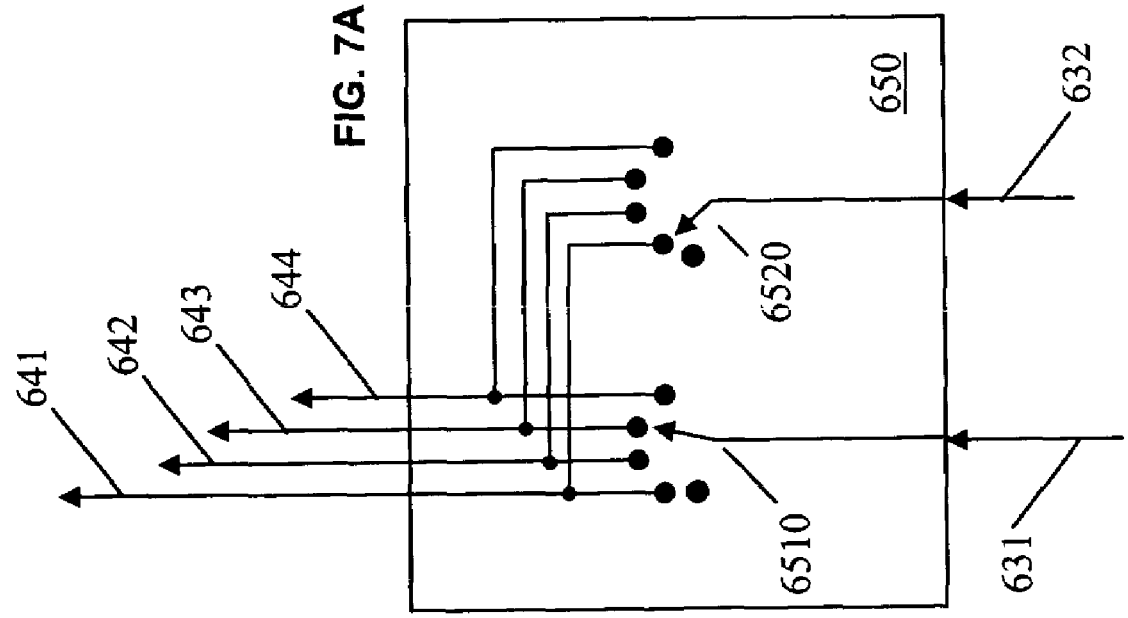

APPARATUS FOR AND METHOD OF USING AN INTELLIGENT NETWORK AND RFID SIGNAL ROUTER

CROSS-REFERENCE TO RELATED APPLICATIONS

This application claims priority from U.S. Provisional Patent Application Nos. 60/657,709, filed Mar. 3, 2005; and 60/673,757, filed Apr. 22, 2005, which are hereby incorporated by reference in their entireties.

This application also expressly incorporates the following U.S. patent applications by reference in their entirety: U.S. patent application Ser. No. 10/338,892, filed Jan. 9, 2003; Ser. No. 10/348,941, filed Nov. 20, 2003; and U.S. Provisional Patent Application Nos. 60/346,388, filed Jan. 9, 2002; 60/350,023, filed Jan. 23, 2002; 60/469,024, filed May 9, 2003; 60/479,846, filed Jun. 20, 2003; and 60/571,877 filed May 18, 2004.

BACKGROUND

Radio frequency identification (RFID) systems typically use one or more reader antennae to send radio frequency (RF) signals to items comprising RFID tags. The use of such RFID tags to identify an item or person is well known in the art. In response to the RF signals from a reader antenna, the RFID tags, when excited, produce a disturbance in the magnetic field (or electric field) that is detected by the reader antenna. Typically, such tags are passive tags that are excited or resonate in response to the RF signal from a reader antenna when the tags are within the detection range of the reader antenna.

The detection range of the RFID systems is typically limited by signal strength over short ranges, for example, frequently less than about one foot for 13.56 MHz systems. Therefore, portable reader units may be moved past a group of tagged items in order to detect all the tagged items, particularly where the tagged items are stored in a space significantly greater than the detection range of a stationary or fixed single reader antenna. Alternately, a large reader antenna with sufficient power and range to detect a larger number of tagged items may be used. However, such an antenna may be unwieldy and may increase the range of the radiated power beyond allowable limits. Furthermore, these reader antennae are often located in stores or other locations where space is at a premium and it is expensive and inconvenient to use such large reader antennae. Alternatively, multiple small antennae may be used. However, such a configuration may be awkward to set up when space is at a premium and wiring is preferred or required to be hidden.

Current RFID reader antennae are designed to maintain a maximum read range between the antenna and associated tags, without violating FCC regulations regarding radiated emissions. When tagged items are stacked, the read range of an antenna can be impeded due to "masking" of the stacked, tagged items. As a result, the masking limits the number of tags that an antenna may read at a given time, and consequently affects the number of products that may be read.

Resonant reader antenna systems are currently utilized in RFID applications, where numerous reader antennae are connected to a single reader. Each reader antenna may have its own tuning circuit that is used to match to the systems characteristic impedance. However, multiple reader antennae (or components thereof) cannot be individually controlled when they are connected by a single transmission cable to a reader unit.

SUMMARY

Apparatuses, systems for, and methods of transporting digital signals and radio-frequency ("RF") signals are disclosed. In accordance with a preferred embodiment of the invention, an intelligent network, a device, and corresponding methods and systems are provided for transporting RF signals to, for example, an RFID antenna and transporting digital signals to, for example, a controller. In a preferred embodiment, the intelligent network is implemented with a manager unit for controlling a plurality of network devices to facilitate the efficient management of RFID-enabled devices. The devices may include a combination router/switch, which has the capability of switching both digital data and RF data, RFID readers, RFID reader/writer pads, and other devices (e.g., antennae). In accordance with preferred embodiments, the intelligent network allows enhanced flexibility in controlling systems for interrogation of RFID antennae.

BRIEF DESCRIPTION OF THE DRAWINGS

FIG. 7A is a schematic diagram illustrating an exemplary switching apparatus for routing RF signals in accordance with a preferred embodiment of the invention;

FIG. 7B is a simplified block diagram illustrating an exemplary switching apparatus for routing RF signals in accordance with a preferred embodiment of the invention;

DETAILED DESCRIPTION

Preferred embodiments and applications of the invention will now be described. Other embodiments may be realized and changes may be made to the disclosed embodiments without departing from the spirit or scope of the invention. Although the preferred embodiments disclosed herein have been particularly described as applied to the field of RFID networks, devices, methods, and systems, and other signaling networks, devices, methods, and systems (e.g., DC pulse communications, and voltage-level based communications (Transistor-Transistor Logic (TTL), etc.)), it should be readily apparent that the invention may be embodied in any technology having the same or similar problems.

Figure 1:
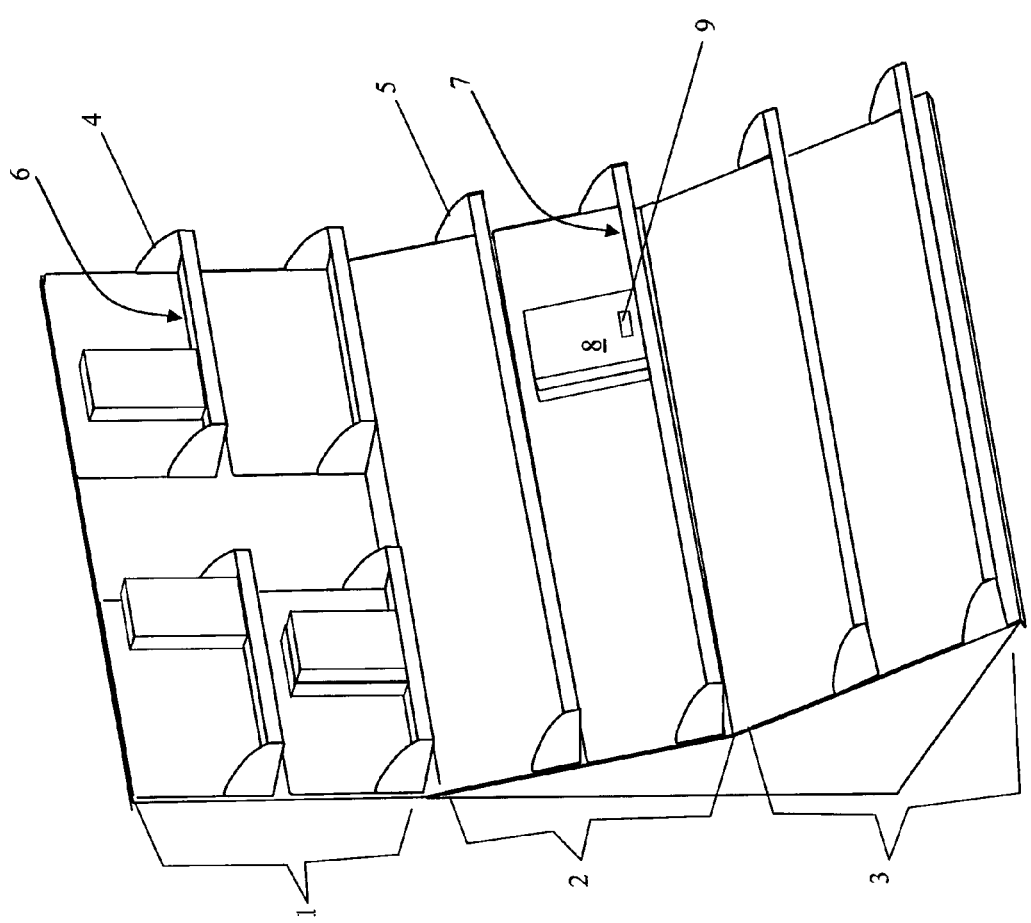
FIG. 1 illustrates the front side of a display fixture in accordance with an exemplary embodiment of the invention.

FIG. 1 shows a front view of a display fixture, incorporating three backplanes 1, 2, and 3 with attached shelves 4 and 5. In the examples herein, antennae will be described that may be placed in, for example, approximately horizontal planes as at positions 6 and 7 in accordance with preferred embodiments of the invention. This display fixture may be useful for monitoring inventory of RFID tagged items, or other marked or tagged items, such as optical disk media 8 (shown on the shelves). As used herein, the term "RFID tagged item" refers to an item marked or tagged in any manner capable of detection, including, but not limited to, RFID, DC pulse communications, and voltage-level based communications (TTL, etc.). As used herein, the term "RFID system," "RFID antennae system," "RFID reader," "reader antennae," or "RFID feed system" refers to any system or device capable of transporting signals related to detection of marked or tagged items including, but not limited to, RFID, DC pulse communications, and voltage-level based communication systems. It is understood that any RFID tagged item can be used in place of optical disk media 8. Preferably optical disk media 8 has an attached RFID tag 9 that can be detected by an RFID system. The display fixture of FIG. 1 is an exemplary implementation of a preferred embodiment, but it should be understood that other fixtures or non-fixtures may embody the invention, and that antennae described here can be used in orientations other than the exemplary horizontal orientation.

Figure 2:
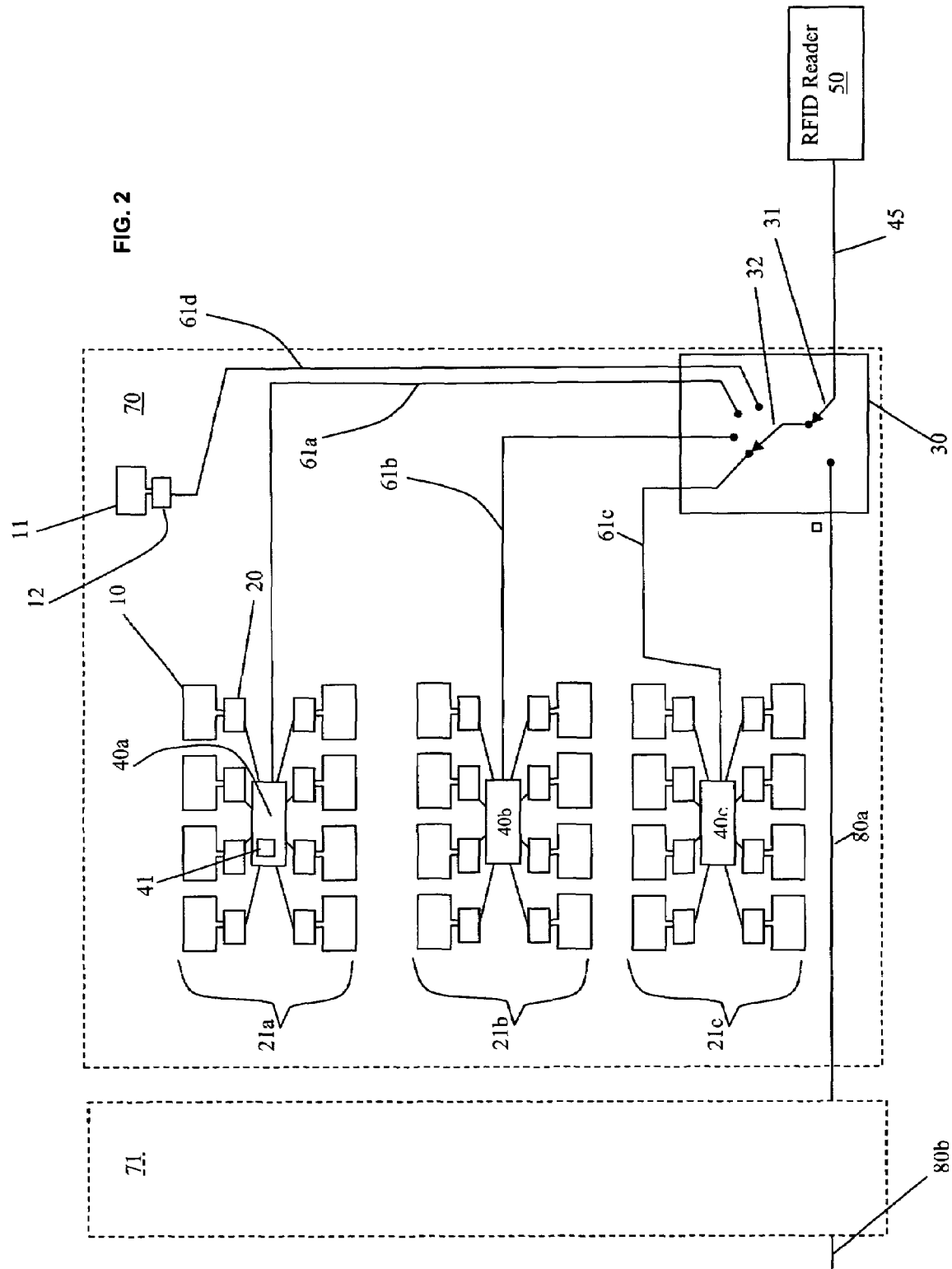
FIG. 2 is a block diagram illustrating an exemplary antenna system in accordance with an exemplary embodiment of the invention.

In accordance with an exemplary embodiment of the invention, a multiple RFID antenna system is illustrated in FIG. 2. The exemplary antenna system includes reader antennae 10, with associated antenna boards 20, gondola controllers 30, shelf controllers 40a, 40b, 40c, and an RFID reader 50. The antenna boards 20 may not be needed for some antenna designs. If present, antenna boards 20 may include tuning components (e.g., tuning circuitry) and other components (e.g., gondola controllers 30, shelf controllers 40a, 40b, 40c) and may include logic and switching controls as necessary to perform the operations described herein. In one embodiment, the antenna board may comprise reader antenna 10.

The RFID feed system shown in FIG. 2 incorporates an RFID reader 50 and a feed line 45 (e.g., a coaxial cable) leading to a structure 70 (e.g., a store display fixture or "gondola"). When additional gondolas are used, the additional gondolas (e.g., gondola 71) may be joined into the circuit as described below.

The RF signal in cable 45 may be routed by gondola controller 30 so that it is sent to shelves on gondola 70, or bypasses gondola 70 and continues on to additional gondolas such as gondola 71. In one preferred embodiment, the term "RF signal" refers to radio frequency signals used, for example, to interrogate an RFID reader antenna or group of antennae. However, it is understood that the term "RF signal" also refers to any other signals capable of being used with the exemplary devices, systems, and methods including, but not limited to, DC pulse communications, or voltage-level based communications (TTL, etc.).

In this embodiment, the term "shelf" refers to one shelf or a group of shelves served by a single shelf controller 40a, 40b, 40c, and the term "gondola" refers to a structure including one or more shelves. The terms "shelf" and "gondola," however, are not meant to be limiting as to the physical attributes of any structure that may be used to implement embodiments of the invention, but used merely for convenience in explaining this embodiment. Any known structure for storing, housing, or otherwise supporting an object may be used in implementing the various embodiments of the invention. For example, an RF switch 31 may either cause the RF signal to bypass the gondola 70, and continue on through connection 80a to gondola 71 (or through connection 80b), or the RF switch 31 may cause the RF signal to feed into gondola 70. It is to be understood that the term "RF switch" refers to any switch capable of transmitting a signal including, but not limited to, RF, DC pulse communications, or voltage-level based communications (TTL, etc.) signals. Furthermore, one or more additional RF switches 32 may route the RF signal to a particular shelf, for example, through connections 61a, 61b, or 61c to shelves 21a, 21b, or 21c upon gondola 70. In a preferred embodiment, a shelf controller (e.g., controller 40a) may switch the RF signal to one or more of the antenna boards 20 and then to antenna 10. It will be appreciated that while FIG. 2 shows three shelves on gondola 70, and eight antennae per shelf, any suitable number of shelves and antennae per shelf may be used in accordance with preferred embodiments of the invention. Furthermore, RF switch 32 can also switch the RF signal to an individual antenna. For example, RF switch 32 can transport the RF signal to antenna 11 (through connection 61d and antenna board 12).

In one embodiment, the use of RF switch 31 may result in an "insertion loss." That is, some RF power may be lost as the signal passes through the switch. Thus, the level of RF power reaching gondola 71 and successive additional gondolas may be less than the RF power reaching gondola 70. It is to be understood that the term "RF power" refers to any power source capable of being used with the devices, systems, and methods described herein including, but not limited to, RF, DC pulse communications, or voltage-level based communication (TTL, etc.) power. In one embodiment, however, the RF power may be approximately equal at each antenna 10. For example, it may be desired to set the RF power level at a given antenna 10 high enough to read all RFID tags attached to items resting on the given antenna 10, but not so high as to read RFID tags attached to items resting on adjacent antennae. RF attenuators can be used in accordance with preferred embodiments of the invention to adjust and/or equalize the power level at each antenna 10. For example, RF attenuators (not shown) could be placed between a shelf controller (e.g., controller 40a) and each antenna 10 and used to regulate the RF power at each gondola. It is to be understood that the term "RF attenuator" refers to any attenuator capable of adjusting and/or equalizing the power level at each antenna including, but not limited to, RF, DC pulse communications, or voltage-level based communication (TTL, etc.) power. The RF attenuators may be chosen, for example, to attenuate the RF power more at gondola 70 and less at gondola 71 and successive additional gondolas. In one embodiment, RF attenuators may be placed at other locations within the circuitry (e.g., in connections 61a, 61b, 61c, or between switches 31 and 32) to achieve the same result, as will be apparent to those skilled in the art. In another embodiment, a variable attenuator can be placed between the reader 50 and the switch 30 such that the power can be digitally controlled for each antenna 10. In another embodiment, the reader 50 may be capable of variable RF power output. Placing an RF power detection circuit on the shelf controllers (e.g., RF power detection circuit 41 located on controller 40a) permits control of the RF power delivered to antenna 10.

In accordance with a preferred embodiment of the invention, a plurality of antennae 10 optionally having associated antenna boards 20, shelf controllers 40a, 40b, 40c, gondola controllers 30, and associated wiring, may all be contained in or on a physical structure, as shown, for example, in FIG. 2 as gondola 70 and gondola 71.

Figure 3:
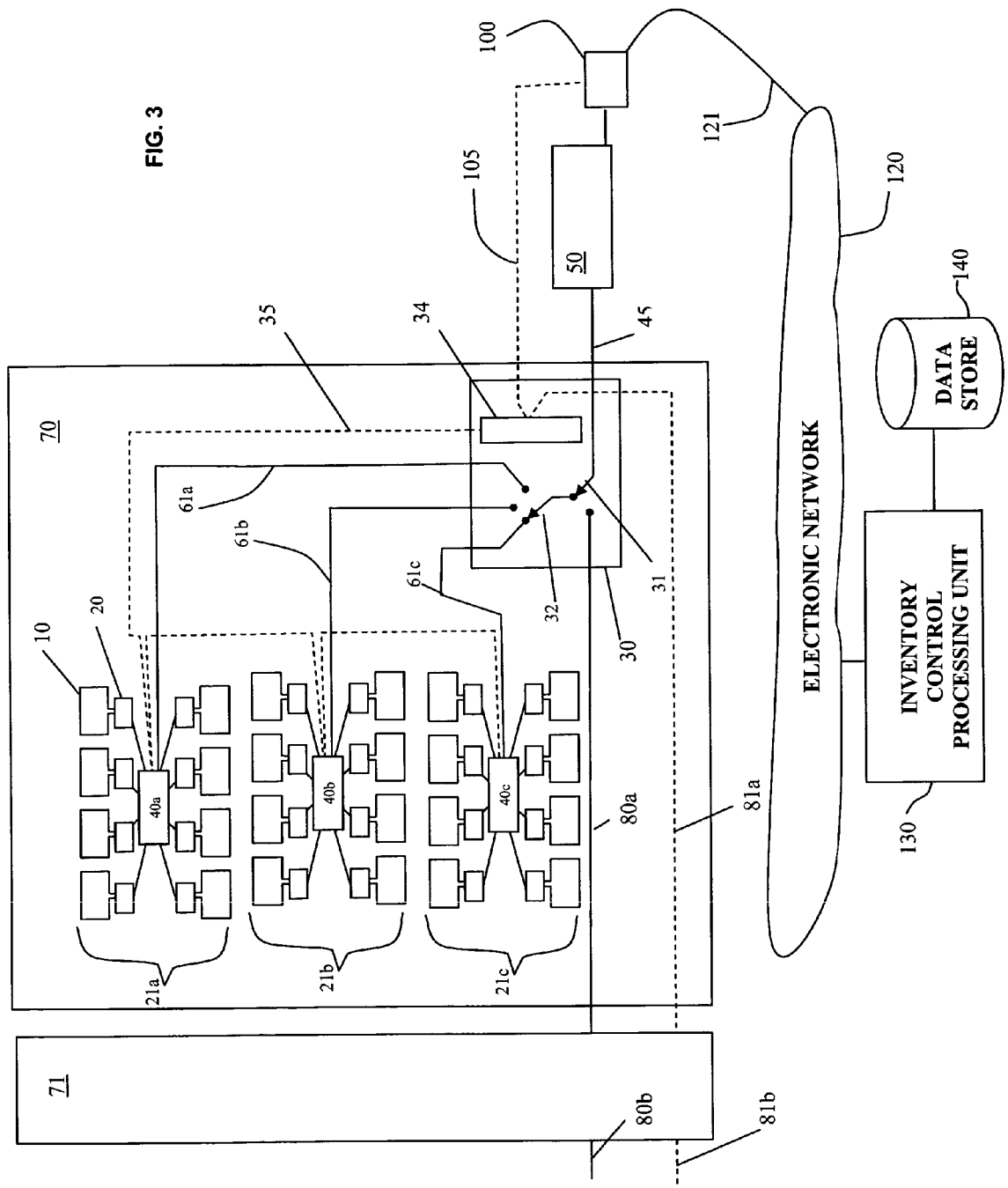
FIG. 3 is a block diagram illustrating another exemplary antenna system incorporating primary, gondola, and shelf controllers to select antennae in accordance with an exemplary embodiment of the invention.

FIG. 3 illustrates an exemplary embodiment with the reader 50 being controlled by a primary controller 100 that sends commands or control signals along control cable 105 to select which antenna is active at any time. In one preferred embodiment, the control signal is a digital signal. The term "digital signal" refers, in one preferred embodiment, to any binary signal encoding data that can be transported via any suitable carrier (e.g., CAN bus, RS-232, RS-485 serial protocols, Ethernet protocols, Token Ring networking protocols, etc). Between gondolas (70, 71, etc.), the commands or control signals (e.g., digital signals) may be carried on control cable 81a and 81b. Within a shelf, the commands or control signals may be carried by cable or cables 35. The primary controller 100 may be a processing device (e.g., microprocessor, discrete logic circuit, application specific integrated circuit (ASIC), programmable logic circuit, digital signal processor (DSP), etc.). Furthermore, the shelves may also be configured with shelf controllers 40a, 40b, 40c, and the gondola controller 30 with circuitry 34 for communicating with the primary controller 100 to, for example, select antennae 10. The shelf controllers 40a, 40b, 40c and gondola controllers 30 may also be microprocessors (or other processing devices) with sufficient input/output control lines to control the RF switches connected to their associated antennae.

In one preferred embodiment, primary controller 100 may selectively operate any of the switches by sending commands (e.g., via digital signals) containing a unique address associated with antenna 10 through, for example, a digital data communication cable 105. The addresses could be transmitted through the use of addressable switches (e.g., switches identical or functionally equivalent to a Dallas Semiconductor DS2405 "1-Wire®" addressable switch). Each such addressable switch, for example, provides a single output that may be used for switching a single antenna. Preferably, the primary controller 100 may selectively operate any or all the switches by utilizing one or more gondola controllers 30 and/or shelf controllers 40a, 40b, 40c. For example, these controllers may be a processing device, which can provide multiple outputs for switching more than one antenna (e.g., all the antennae 10 in proximity to the shelf controller 40a, 40b, 40c). The primary controller 100 may also be any processing device. Communications between the primary controller 100 and the gondola controller 30, for example, can be implemented by using communication signals in accordance with well known communication protocols (e.g., CAN bus, RS-232, RS-485 serial protocols, Ethernet protocols, Token Ring networking protocols, etc.). Likewise communications between the gondola controller 30 and shelf controller 40a, 40b, 40c may be implemented by the same or different communication protocols.

The term "intelligent station" generally refers to equipment, such as a shelf, which may include controllers, switches and/or tuning circuitry, and/or antennae. More than one intelligent station may be connected together and connected to or incorporated with an RFID reader. A primary controller can be used to run the RFID reader and the intelligent stations. The primary controller itself may be controlled by application software residing on a computer. In one embodiment, an "intelligent station" is an "intelligent shelf."

In a preferred embodiment, the intelligent shelf system is controlled through an electronic network 120, as shown in FIG. 3. The network can include, for example, the Internet, Ethernet, a local network, Controller Area Network (CAN), serial, Local Area Network (LAN), Wide Area Network (WAN). A controlling system that controls the intelligent shelf system will send command data to the primary controller 100 via Ethernet, RS-232, or other signaling protocol. These commands include, but are not limited to, instructions for operating the RFID reader unit 50 and switches associated with gondola controllers 30 and shelf controllers 40a, 40b, 40c. The primary controller 100 is programmed to interpret the commands that are transmitted through the unit. If a command is intended for the reader unit 50, the primary controller 100 passes that command to the reader unit 50. Other commands could be used for selecting antennae 10, and these commands will be processed if necessary by primary controller 100 to determine what data should be passed through digital data communication cable 105 to the gondola controllers 30 and, for example, on to the shelf controllers 40a, 40b, 40c.

Likewise, the shelf controllers 40a, 40b, 40c, and the gondola controllers 30 can transport data signals to the primary controller 100, as can the reader unit 50. In one preferred embodiment, primary controller 100 transports result data back to the controlling system through the electronic network 120. The inventory control processing unit 130, shown in FIG. 3, is one example of such a controlling system. As discussed further herein with respect to the intelligent shelf system, the electronic network and controlling system are used interchangeably to depict that the intelligent shelf system may be controlled by the controlling system connected to the intelligent shelf system through an electronic network 120.

Primary controller 100 of FIG. 3 can determine whether a command from the electronic network 120 should be sent via a digital signal to reader 50, or should be sent through the communication cable 105. Primary controller 100 can relay data it receives from the communication cable 105, and from reader unit 50, back to the electronic network 120. In one preferred embodiment, the electronic network issues a command to read one or more antennae. In this embodiment, the primary controller 100 can send a digital signal to (a) set the proper switch or switches for that antenna, (b) activate the reader, (c) receive data back from the reader, (d) deactivate the reader, and (e) send the data back to the electronic network 120. Further details of the processing of command signals from a host by the controller can be found in U.S. patent application Ser. No. 10/338,892 (filed Jan. 9, 2003), which has been incorporated by reference in its entirety herein.

In a preferred embodiment, the primary controller 100 can be placed between the electronic network 120 and the reader as shown, for example, in FIG. 3. In this embodiment, a variety of reader types (e.g., readers 50) can be used as needed. For example, the commands from the electronic network 120 to the controller 100 may be transported using generic control data (e.g., not reader-specific), thus allowing for expanded uses by various types of readers. In this preferred embodiment, the electronic network 120 can send a "read antennae" command to a controller 100. The controller 100 in turn can then translate this command into the appropriate command syntax required by each reader unit 50. Likewise, the controller 100 can also receive the response syntax from the reader unit 50 (which may differ based on the type of the reader unit), and parse it into a generic response back to the electronic network 120. The command and response syntax may differ for each type of reader unit 50, but the primary controller 100 makes this transparent to the electronic network 120.

In FIG. 3, a portion of the control cable 81*a* that extends beyond shelf 70, and a portion of the RF cable 80*a* extends beyond shelf 70, are shown outside of the shelf. However, as would be recognized by those skilled in the art, these extended portions of the cables may also be contained within the shelf or another structure. Additional extended control cable portions 81*b* and additional extended RF cable portions 80*b* may be used to connect to more shelves or groups of shelves. Likewise, additional shelves (not shown) may be added to groups of shelves, for example, to gondolas 70 or 71 as would be apparent to those skilled in the art.

The item information data collected by the reader units 50 from each of the intelligent shelves may be transmitted to an inventory control processing unit 130. The inventory control processing unit 130 is typically configured to receive item information from the intelligent shelves. The inventory control processing unit 130 is typically connected to the intelligent shelves over an electronic network 120 and is also associated with an appropriate data store 140 that stores inventory related data including reference tables and also program code and configuration information relevant to inventory control or warehousing. The inventory control processing unit 130 is also programmed and configured to perform inventory control functions that are well known to those skilled in the art. For example, some of the functions performed by an inventory control (or warehousing) unit include: storing and tracking quantities of inventoried items on hand, daily movements or sales of various items, tracking positions or locations of various items, etc.

In operation, the inventory control system would determine item information from the intelligent shelves that are connected to the inventory control processing unit 130 through an electronic network 120. In one preferred embodiment, one or more intelligent shelves are controlled by inventory control processing unit 130. Inventory control processing unit 130 can determine when the reader units 50 are under control of primary controller 100 and poll the antennae 10 to obtain item inventory information. In an alternate embodiment, the controller(s) 100 may be programmed to periodically poll the connected multiple antennae for item information and then transmit the determined item information to the inventory control processing unit 130 using a reverse "push" model of data transmission. In a further embodiment, the polling and data transmission of item information by the primary controller 100 may be event driven, for example, triggered by a periodic replenishment of inventoried items on the intelligent shelves. In each case, the primary controller 100 would selectively energize the multiple antennae connected to reader 50 to determine item information from the RFID tags associated with the items to be inventoried.

Once the item information is received from the reader units 50 of the intelligent shelves, the inventory control processing unit 130 processes the received item information using, for example, programmed logic, code, and data at the inventory control processing unit 130 and at the associated data store 140. The processed item information is then typically stored at the data store 140 for future use in the inventory control system and method of the invention.

Figure 4:
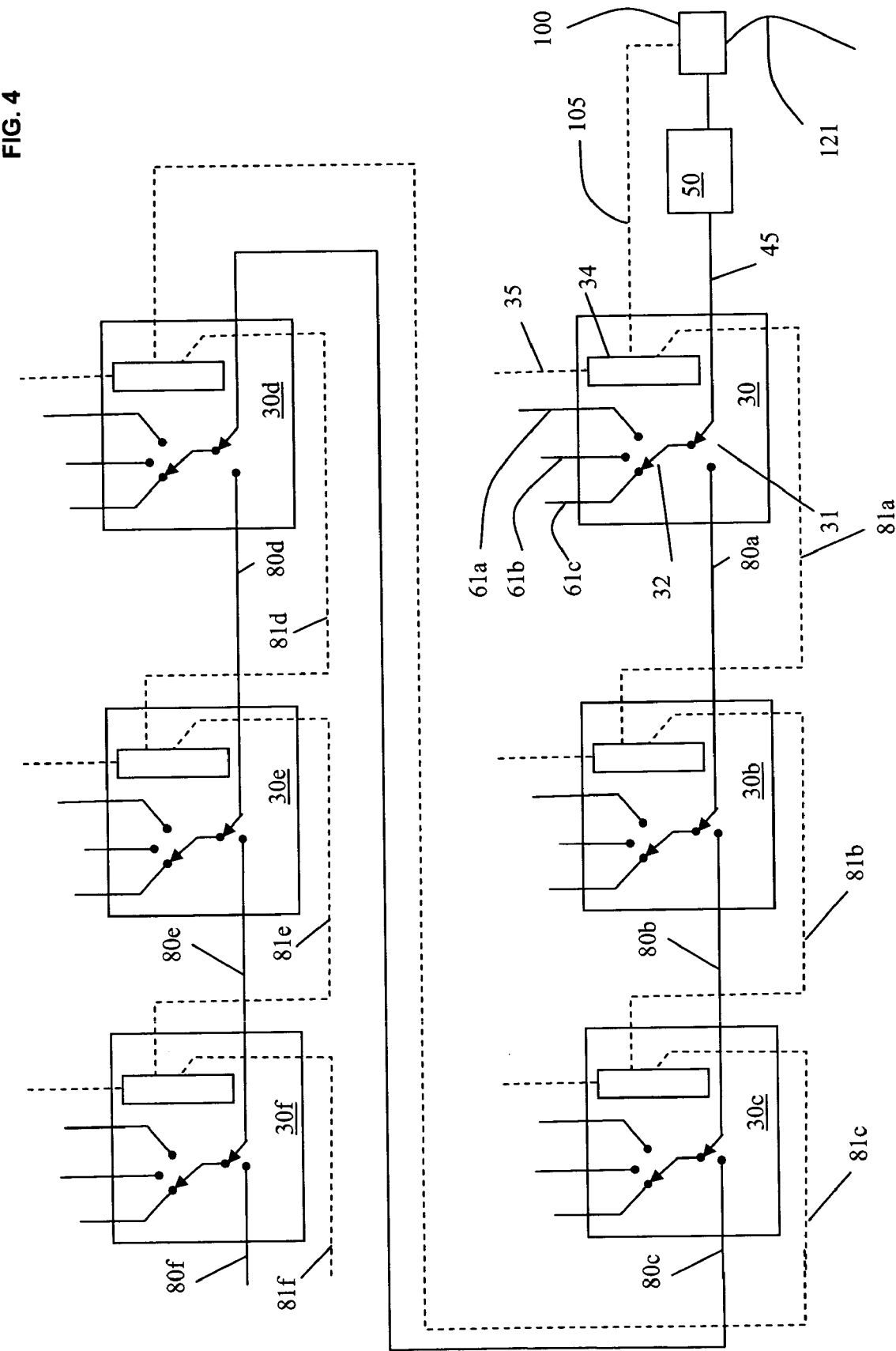
FIG. 4 is a block diagram illustrating another exemplary antenna system further incorporating additional gondola controllers in accordance with an exemplary embodiment of the invention.

FIG. 4 illustrates an exemplary embodiment, showing parts of the system that connect to several gondola controllers 30, 30*b*, 30*c*, 30*d*, 30*e*, and 30*f*. Other parts of a system that may be associated with a gondola 70, 71, as shown in FIG. 3, for simplicity are not repeated in FIG. 4 (or if repeated, are not described where the structural and functional aspects are substantially the same as in FIG. 3). FIG. 4 illustrates how an RFID reader 50 may send RF signals along connection 45 to gondola controller 30 and how the RF signals may then be directed to additional gondola controllers along connections 80*a*, 80*b*, 80*c*, 80*d*, 80*e*, and 80*f*. Likewise primary controller 100 may send commands or control signals along cable 105 to gondola controller 30, and from there on to additional gondola controllers through connections 81*a*, 81*b*, 81*c*, 81*d*, 81*e*, and 81*f*. In a preferred embodiment, the command or control signals (e.g., digital signals) can select a communication route for sending an RF signal (e.g., from RFID reader 50 to connection 61*c* through switches 31 and 32).

Figure 5:
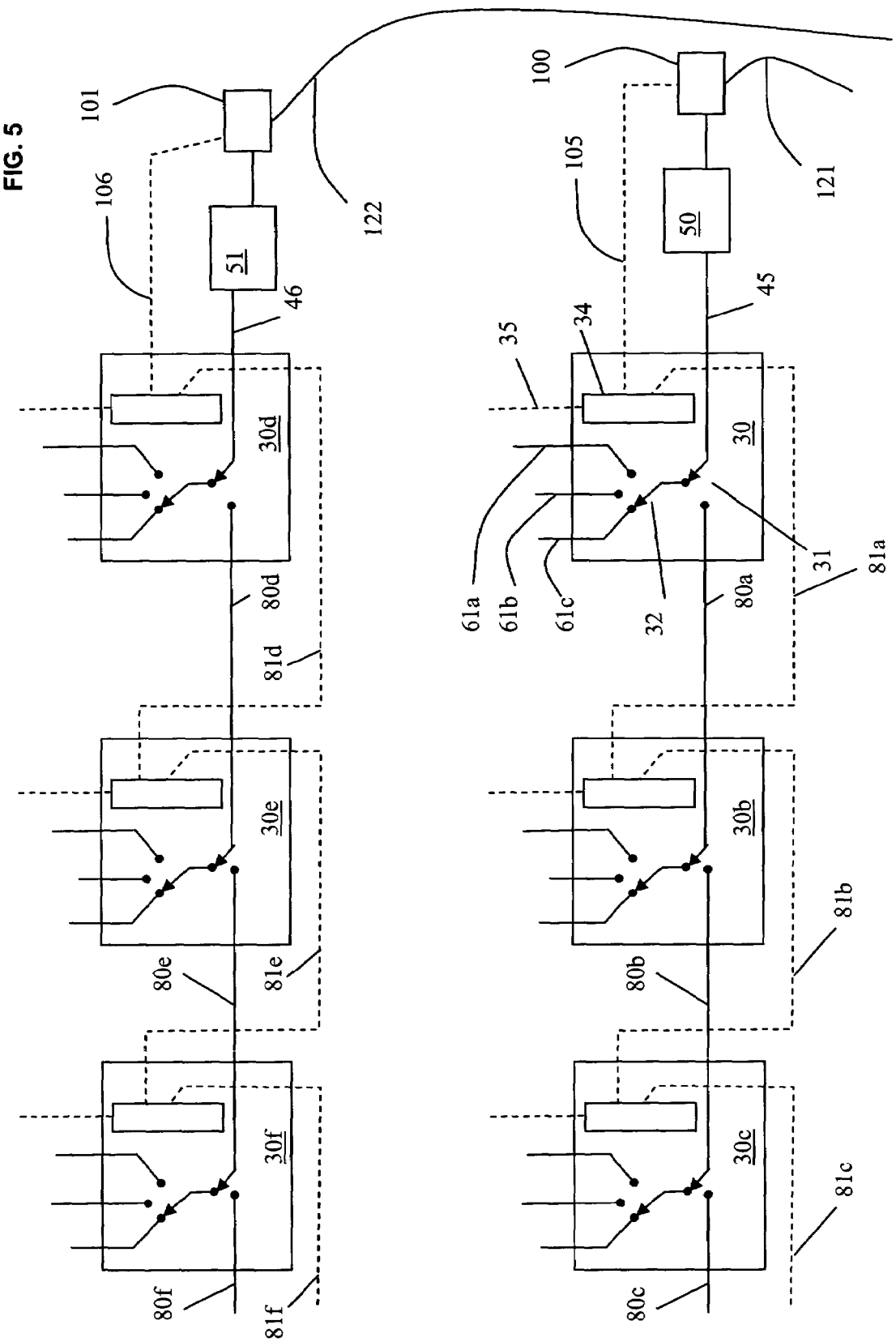
FIG. 5 is a block diagram illustrating another exemplary antenna system further incorporating multiple RFID readers in accordance with an exemplary embodiment of the invention.

FIG. 5 illustrates an exemplary embodiment, showing parts of the system that connect to several gondola controllers 30, 30*b*, 30*c*, 30*d*, 30*e*, and 30*f*. Other parts of a system that may be associated with a gondola, as shown in FIG. 3 or FIG. 4, for simplicity are not repeated in FIG. 5 (or if repeated, are not described where the structural and functional aspects are the same as in FIG. 3 or 4). FIG. 5 illustrates how a second RFID reader 51 can send RF signals along connection 46 to gondola controller 30*d* and how the RF signals may then be directed to additional gondola controllers along connections 80*d*, 80*e*, and 80*f*. Likewise another primary controller 101 may send commands or control signals along cable 106 to gondola controller 30*d*, and from there on to additional gondola controllers through connections 81*d*, 81*e*, and 81*f*. In another preferred embodiment, using more than one controller 100, 101 or RFID reader 50, 51 may improve reliability and speed.

The architecture of the Internet is an example of technology where digital data traveling between two computers is typically routed along a path that may pass through several intervening computers (also known as routers). Furthermore the path may change from time to time, or even during a single transmission. Routing methods have been developed to control the data path so that orderly and simultaneous transmissions may occur between multiple computers. Some of the routing methods that may be used include distance-vector types such as RIP (Routing Information Protocol) and (Cisco's) IGRP (Interior Gateway Routing Protocol), and link-state methods such as OSPF (Open Shortest Path First) and (Cisco's) EIGRP (Enhanced Interior Gateway Routing protocol). These routing methods are well known and are used as examples only, but the concept of a router is not limited by the routing method used to choose the data path.

While the concept of a digital data router is known, one preferred embodiment of the invention is directed to a combination router that routes both RF and digital signals. The router, in one embodiment, can transport an RF signal from an RFID reader 50, 51 along one or more paths to a particular antenna or group of antennae. Such an RF router may be used, for example, to provide redundancy or backup capability for the RF signal paths. In another preferred embodiment, the router is capable of transporting command or control signals (e.g., digital data) between a primary controller 100, 101 and an antenna or antennae 10. In yet another embodiment, a switching system is provided for selecting communication routes (e.g., predetermined data pathways and through predetermined nodes or routers) for RF signals (e.g., between an RFID reader and antenna(e)) and for data signals. In this embodiment, the RF signals and data signals can be transported along an RF pathway following substantially the same communication route as the pathway for digital signals. In one preferred embodiment, the communication routes for RF signals and for digital signals are different. In order to determine which pathways are available for RF signals, in one embodiment the combination router may communicate RF or non-RF "neighbor query" signals over the available RF pathways. By using neighbor query signals, each combination router may determine which other combination routers or other devices are connected to the combination router, and the system may then determine all available RF pathways.

Figure 6:
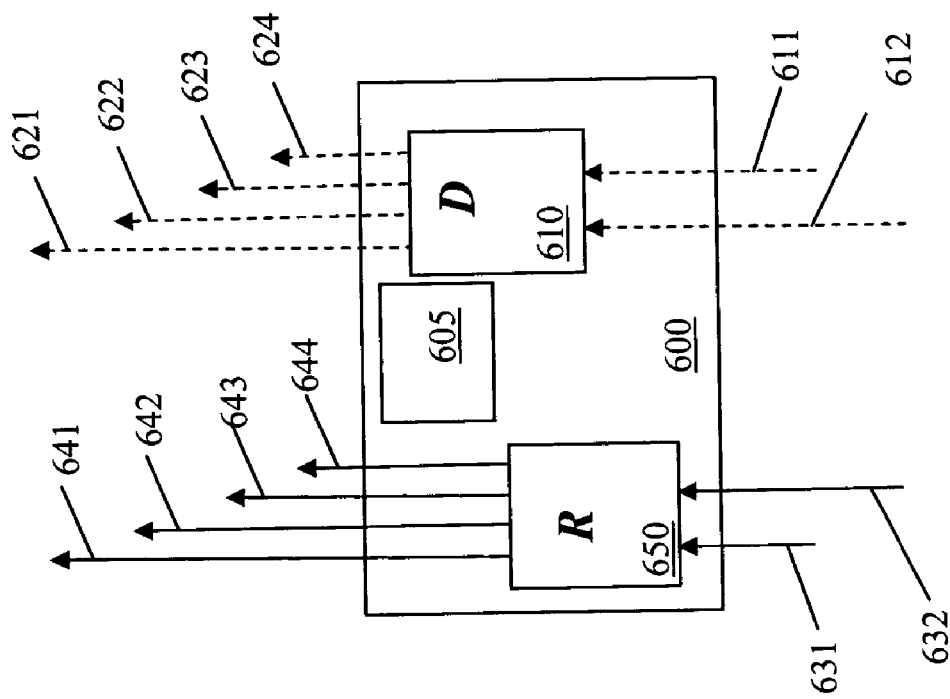
FIG. 6 is a block diagram illustrating an exemplary combination router in accordance with a preferred embodiment of the invention.

FIG. 6 illustrates an exemplary combination router 600 for RF signals as well as command or control signals in accordance with a preferred embodiment of the invention. Additional description of such a router can be found in U.S. Patent Application No. 60/657,709, which has been incorporated by reference herein in its entirety. Preferably, the combination router 600 may comprise one or more logical units 605 that cooperate with a data router 610, and an RF router 650. It should be understood that such an exemplary combination router can comprise any suitable number of logical units 605, data routers 610 and RF routers 650. In an exemplary embodiment, the data router 610 and RF router 650 are located proximate to one another, for example, within combination router 600. For simplicity in the following discussion, one or more data routers such as 610 may be designated "D", and one or more RF routers such as 650 may be designated "R". Furthermore for simplicity, logical units 605 with a combination router may be omitted from some drawings. Data router 610 may operate according to established routing methods such as RIP, OSPF, or any other routing method. In this example data router 610 has multiple ports that each may have bidirectional capabilities. For illustrative purposes, two such ports have been labeled as inputs 611 and 612, although more or fewer inputs may be used. Other ports have been labeled as outputs 621, 622, 623, and 624, although more or fewer outputs may be used. RF router 650 may operate such that the RF signals follow essentially the same routes as the data signals, or RF router 650 may send RF signals along routes that are similar or even different from the data signals. In this example, RF router 650 has two inputs 631 and 632 and four outputs 641, 642, 643, and 644, although more or fewer inputs and outputs may be used. It is understood the terms "input" and "output" are used for convenience herein, and that RF and data communications may take place in either direction. For example, data signals and RF signals can be transported from a controller and an RF antenna respectively through the "outputs" of the combination router and out the "inputs" to their destination (e.g., a primary controller 100, 101 and an RFID reader 50, 51, respectively). In addition, devices (e.g., reader) which may be connected in some portions of the network to an "input" port may be attached to an "output" port without limiting the functionality or capabilities of the devices in the system or the configuration of the system. Similarly, other devices (e.g., antenna) which may be connected in some portions of the network to an "output" port may be attached to an "input" port without limiting the functionality or capabilities of the devices in the system or the configuration of the system.

Data router 610 may be a "router" such as is used on the Internet or on other digital networks, or it may be any device which accomplishes the task of routing digital data. It is well known that digital data may be divided into "packets" for transmission over networks. In passing through a data router 610, the data may temporarily be placed in local memory while data switching is being done. "Switching" may occur such that data received through an "input" is then routed to one or more "outputs," or back out a second "input." However, for explanation purposes here it will be assumed that data is received in one input and are routed to one output.

In one preferred embodiment, RF router 650 is configured so that one input is routed to one and only one output, although a plurality of switching devices may be provided to switch individual signals. FIG. 7A shows an example where an RF signal entering on input connection 631 is routed through RF switch 6510 to output connection 643. Also, an RF signal entering on input connection 632 is routed through RF switch 6520 to output connection 641. In FIG. 7B, the diagram is simplified by the use of a crossover ("X") 6530 to denote the RF path, without showing the details of RF switches 6510 and 6520. The RF switches 6510, 6520, 6530 may include any number and type of devices capable of switching an RF signal, for example, PIN diodes or other RF switching devices.

Figure 8:
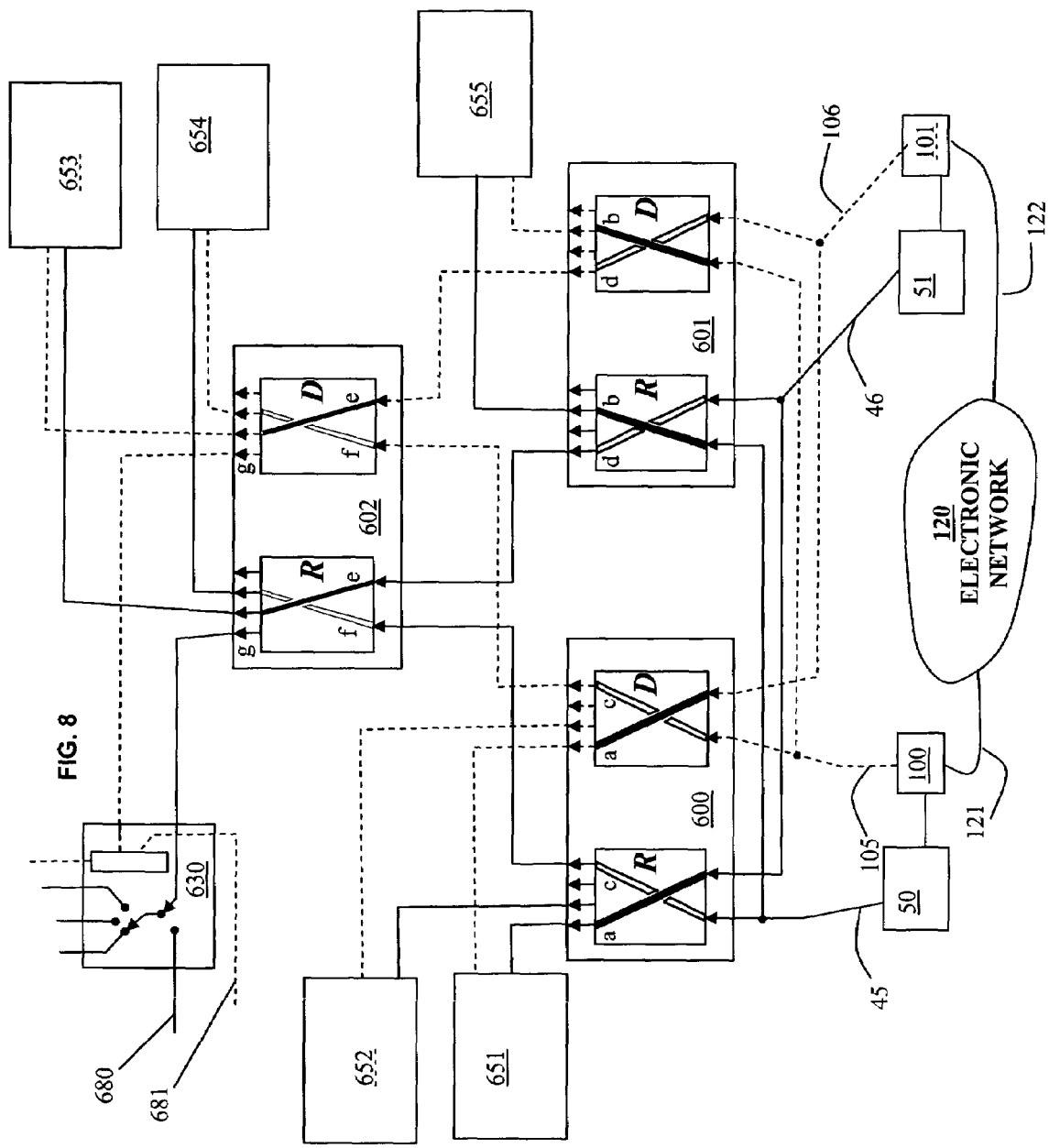
FIG. 8 is a block diagram illustrating an exemplary system for routing data and RF signals in accordance with a preferred embodiment of the invention.

FIG. 8 illustrates an exemplary system for routing data and RF signals in accordance with a preferred embodiment of the invention. An electronic network 120 may be used with connection 121 to a primary controller 100, and an RFID reader 50 may be connected to primary controller 100. One or more additional primary controllers may be used, such as primary controller 101 (connected to the electronic network 120 through connection 122 and having an RFID reader 51 connected. As described herein, the readers 50, 51 may be controlled by the primary controllers 100, 101. One or more combination routers 600, 601, 602, etc. may be provided to route data and RF signals. For example, primary controller 100 may be connected via connection 105 to a data input on the data ("D") part of combination router 600, and may also be connected to a data input on the data ("D") part of another combination router 601. Also, for example, RFID reader 50 may be connected via connection 45 to an RF input on the RF ("R") part of combination router 600, and may also be connected to an RF input on the RF ("R") part of another combination router 601. Each combination router 600, 601, 602, etc. can comprise any suitable number of logical units 605, data routers 610, and RF routers 650.

Similarly, additional primary controller 101 may be connected via connection 106 to a data input on the data ("D") router of combination router 600, and may also be connected to a data input on the data ("D") router of another combination router 601. Also for example, RFID reader 51 may be connected via connection 46 to an RF input on the RF ("R")

router of combination router 600, and may also be connected to an RF input on the RF ("R") router of another combination router 601 via connection 46. The data inputs 105 and 106 are understood to be connected to different inputs on the combination routers, as are the RF inputs 45 and 46.

Additional combination routers may be provided, such as combination router 602. Further, the combination routers may be connected to other combination routers (such as the output of combination router 600 being connected to the input of combination router 602). Further the combination routers may be connected to other devices such as antenna systems 651, 652, 653, 654, and 655. Furthermore, as taught herein, other devices connected to the combination router may connect to additional devices.

FIG. 8 further illustrates several preferred embodiments with alternate connection options. For example, combination router 600 can be configured with switch paths "a" connected and switch paths "c" disconnected and with combination router 601 configured with switch paths "b" connected and with switch paths "d" disconnected. In this illustration, the data signals from primary controller 100 and the RF signals from RFID reader 50 are routed through connected switch paths "b" in combination router 601 to antenna system 655, while the data signals from primary controller 101 and the RF signals from RFID reader 51 are routed through connected switch paths "a" in combination router 600 to antenna system 651.

In another example (not illustrated), combination router 600 may be configured with switch paths "c" connected, and switch paths "a" disconnected and combination router 601 is configured with switch paths "d" connected and with switch paths "b" disconnected. Further, for example, combination router 602 may be configured with switch paths "e" and "f" connected and with switch paths "g" disconnected. In this case, the data signals from primary controller 100 and the RF signals from RFID reader 50 are routed through switch paths "c" and "f" to antenna system 654, while the data signals from primary controller 101 and the RF signals from RFID reader 51 are routed through switch paths "d" and "e" to antenna system 653.

Not all available (or possible number of) switch pathways are illustrated in FIG. 8. As shown previously as an example in FIG. 7A, each of the two data signals input to a combination router 600, 601, 602 may be sent along any one of the four exemplary through paths, or along no path at all. Any number of paths and/or ports may be used. Likewise each of the two RF signals input to a combination router 600, 601, 602 may be sent along any one of four through paths, or along no path at all. Preferably, a data signal and its associated RF signal (e.g., data signal along connection 105 and RF signal along connection 45) will follow a path through the same combination routers. It is therefore possible using the system illustrated in FIG. 8 to have primary controller 100 and its associated RFID reader 50 communicate with any of the antenna systems (e.g., 651, 652, 653, 654, 655). Likewise primary controller 101 and its associated RFID reader 51 may communicate with any of the antenna systems.

In an illustrated operation of the exemplary embodiment represented by the system of FIG. 8, the electronic network 120 may provide a command to read antenna system 654. The system may then determine a method to read the desired antenna system 654. Methods of routing such as the RIP method and the OSPF method (or other methods) may be utilized to determine a path for digital data between the electronic network 120 and antenna system 654. As an example, the logical unit 605 (FIG. 6) within each combination router 600, 601, 602 may communicate with other combination routers 600, 601, 602 and with the primary controllers 100, 101 and electronic network 120 to establish a suitable data path. Parameters such as the operating readiness of the combination routers 600, 601, 602 may be considered by the system in determining a suitable data path. When a suitable data path has been established through one or more combination routers 600, 601, 602, the RF path may be set along a path through the same combination routers 600, 601, 602, or additional parameters such as the operating readiness of RF switching components may be considered to determine if the proposed route would be suitable for the RF path. In accordance with a preferred embodiment, the primary controller 100, 101 may be configured to establish the data path using known routing methods such as OSPF or RIP. In a preferred embodiment, the electronic network 120 may also have some intelligence, for example, to send control messages to the primary controller 100, 101 to assist in setting up the path.

If no data path can be determined, an alternate pathway can be determined. For example, as an alternative the RF operational readiness parameters may be considered as factors in the initial pathway selection algorithm or other methodology utilized by the primary controller 100, 101.

It should be noted that additional devices may be attached to the exemplary system shown in FIG. 8. For example, a device such as gondola controller 630 (as previously described) may be connected to one of the outputs of combination router 602. When an appropriate pathway (not shown but designated "g") is provided, digital data may be provided to gondola controller 630, and may continue to other devices along connection 681. Likewise, RF signals may be connected to gondola controller 630, and may continue to other devices along connection 680. The other devices may include other gondola controllers or other combination controllers.

In a preferred embodiment, one or more system components (e.g., combination router 600, 601, 602) may include circuitry to determine the operation (e.g., the RF power, active status, fault status, etc.) at one or more devices (e.g., readers) at various locations in the system. The RF power of such devices (e.g., of a reader), for example, in accordance with a preferred embodiment of the invention, can be adjusted or attenuated so that a desired power level is obtained at the component (e.g., combination router 600, 601, 602, a particular one or more antennae 10, etc.). In a preferred embodiment, the system component (e.g., combination router 600, 601, 602) may also comprise circuitry to measure the Voltage Standing Wave Ratio (VSWR) when a particular antenna is selected, in order to gain information about the antenna or the RF connection between the router and the antenna. Ideally, the VSWR is 1.0, but it can be greater than 1.0 if the antenna is disconnected or is not optimally tuned. In accordance with a preferred embodiment, the system may use the VSWR information measured by the component to provide alerts about suboptimal operation, or to cause the antenna tuning to be adjusted, for example, through variable tuning components such as varactors (voltage controlled capacitors).

Figure 9:
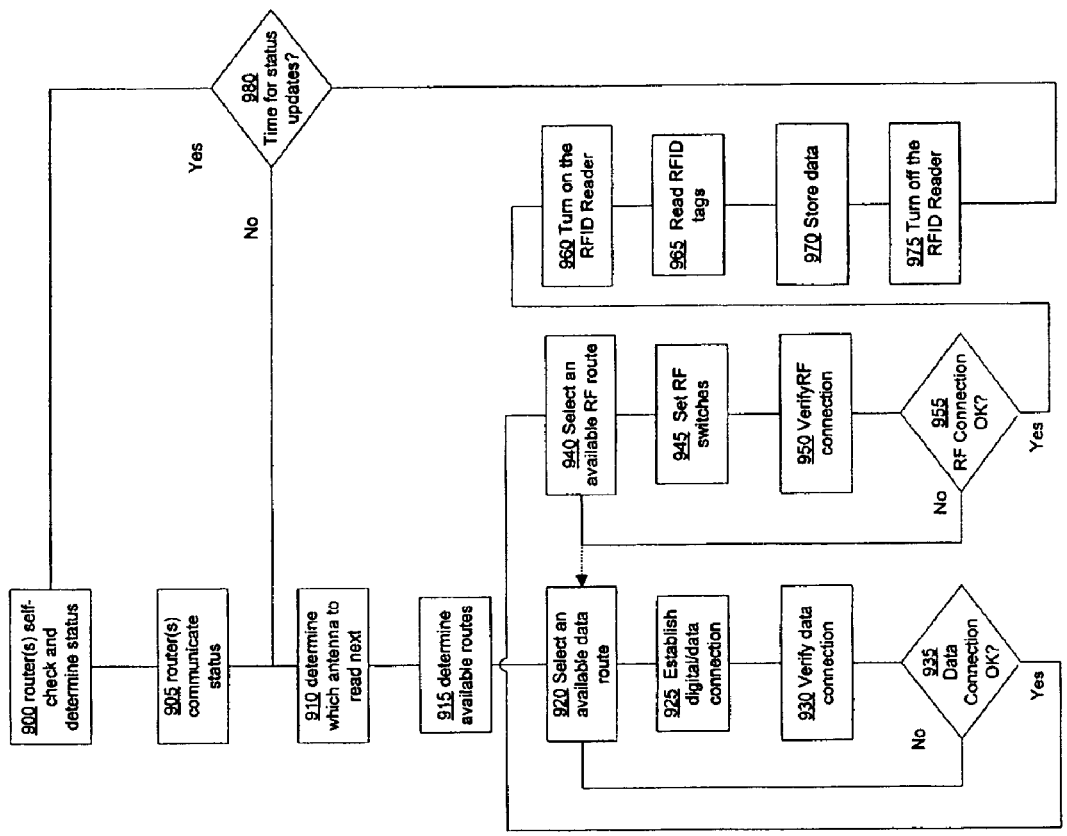
FIG. 9 is a flow chart illustrating an exemplary method for routing data and RF signals in accordance with a preferred embodiment of the invention.

FIG. 9 shows a flowchart illustrating an exemplary method of operating a system using combination routers 600, 601, 602 in accordance with a preferred embodiment. For exemplary purposes only, the path described is from the electronic network 120 through RF reader 50 and/or primary controller 100, to antenna system 653. In step 900, the combination routers 600, 601, 602 may perform a self-check and determine their status. Such a self-check could comprise an integrity check (e.g., a determination of which input and output ports on data router 610 were functional or were connected to or in communication with other devices as is well known in the art). The combination routers 600, 601, 602 as described previously may contain a logic unit 605 that may be a microcomputer device programmed to routinely perform integrity checks and communicate their status to other devices.

In addition to the integrity checks, the combination routers 600, 601, 602 may also check the integrity of the RF router 650 in accordance with an embodiment of the invention. Such an integrity check may, for example, determine whether the RF switches (e.g., RF switches 6510, 6520, 6530) are functioning properly through a test or from recent logged data. These checks may also include determining the type of device that is connected to the output ports (e.g., antenna 10, router 602, RF switches 6510, 6520, etc.). The diagnostics can also determine if the antennae 10 connected to the device are within operational parameters.

In step 905, the combination router 600 may communicate its status to other components of the system (e.g., combination routers 601, 602, electronic network 120, etc.). The combination routers 600, 601, 602 and/or the electronic network 120 may then store the status information for use in determining available routes for data and RF signals.

In step 910, the next antenna 10 to be read is determined from, for example, a table, an ordered list, a priority queue, a schedule, a user input, other factors, or a combination of some or all factors.

In step 915, the available routes by which a reader 50 and/or primary controller 100 may communicate with the desired antenna system 653 are determined by a variety of factors (e.g., the stored status information, recent history such as the outcome of earlier attempts to communicate with the desired antenna 10, etc.).

In step 920, if applicable, a data route may be selected from the available data routes. (If not applicable, flow advances to step 940.) Such selection may be based on criteria such as a routing method, for example, RIP or OSPF, or on other criteria suitable for determining a data route.

In step 925, a data connection may be established between a primary controller 100 and the desired antenna 10. For example, the data connection may be established by causing the appropriate data switches (not shown) to be set in one or more combination routers 600, 601, 602.

In step 930, that the data connection has been established may be verified between the primary controller 100 and the desired antenna 10. This verification could, for example, be by a "handshake" communication between the primary controller 100 and the antenna system 653.

In step 935, the acceptability of the data connection may be decided. If the data connect is not acceptable, the flow returns to step 920 to select an alternate data route. If the data connection is acceptable, the flow next moves to step 940.

In step 940, an available RF route may be selected. Preferably, this route will be through the same combination routers 600, 601, 602 as the data connection. Thus the data routing method (augmented by RF integrity checks in step 900) may be used to select the RF route as well.

In step 945, the appropriate RF switches 6510, 6520, 6530 may be set in one or more combination routers 600, 601, 602 in order to provide an RF connection between the RFID reader 50 and the antenna system 653.

In step 950, that the RF connection has been established may be verified between the RFID reader 50 and the desired antenna 10. This verification could, for example, be by a confirmation from the combination router(s) 600, 601, 602 that the appropriate RF switch(es) 6510, 6520, 6530 had been set, or could be, as another example, through a VSWR check to ensure the RF connection is operating within allowable limits.

In step 955, the acceptability of the RF connection is decided. If the RF connection is not acceptable, the flow returns to step 940 to select an alternate RF route. Alternately, the flow may return to step 920 and select a different data route. If the RF connection is acceptable, the flow moves to step 960.

In step 960, the RFID reader 50 is turned on, if it has been off or on standby during the previous operations. Having the RFID reader 50 off or on standby may save power, reduce extraneous RF transmissions, and prevent damage to RF switches 6510, 6520, 6530 during state changes.

In step 965, the RFID tags (e.g. RFID tag 9) are read (e.g., by the connected antenna system 653).

In step 970, any data obtained from the RFID tags 9 may be stored.

In step 975, the RFID reader 50 may be turned off (or placed on standby).

In step 980, the time for status updates is determined. If it is time for a status update, the flow may return to step 900 and continue from there. Alternately, the combination routers 600, 601, 602 independently may continuously or periodically check status per steps 900-905. If a status check is not needed, or after a status check is performed, the flow continues in step 910 by determining which antenna 10 to read next.

In accordance with a preferred embodiment of the invention, an intelligent network may be implemented to facilitate transportation of signals. In an RFID-based system, for example, where RFID signals are to be transported, such an intelligent network may be used to manage the transportation of RFID signals to and from RFID-enabled devices. Preferably, the intelligent network employs one or more manager units used to manage the network. The manager units may incorporate one or more microprocessors or other processing devices used to execute the operations described herein. In particular, the manager units control the network processing of signals over the network and coordinate the inclusion/exclusion of devices on the network.

In accordance with a preferred embodiment, the intelligent network further includes one or more network devices that use the signals transported over the network or facilitate transportation of such signals. The network devices may include one or more combination routers and/or combination switches, as described above, that have the capability of processing and facilitating the transporting of both RF data and digital data signals. Like the manager unit, the network devices may incorporate one or more microprocessors or other processing devices to execute the operations described herein. The network devices may further include RFID readers used to read RFID-enabled devices, as well as RFID reader/writer pads used to read and write RFID-enabled devices.

In accordance with a preferred embodiment, the intelligent network operates to automatically and dynamically reconfigure its network topology as network devices are included or excluded during operation. Preferably, when any network device attempts to be added to the intelligent network, its presence in the network is detected by the manager unit. In a preferred embodiment, for example, a new network device when activated on the intelligent network may issue a notification to the manager unit (directly or through other network devices). The manager unit upon receiving the notification reconfigures its map of the network topology.

In accordance with a preferred embodiment, a new network device may also be detected by its neighboring network devices. Neighboring network devices may detect the notification sent by the new network device and alert the manager unit of the location of the new network device. In accordance with a preferred embodiment of the invention, neighboring network devices detect each other preferably by detecting and exchanging information over the same line for which RF signals will travel. This alert causes the manager unit to be alerted of the new network device, the RF topology and other aspects of the network, and allows the manager unit to reconfigure its map of the network topology.

By continuously maintaining and reconfiguring a network topology, the manager unit is able to more efficiently set up and control the paths of the RF and digital data signals that are transported through the network from one network device to another.

In accordance with a preferred embodiment of the invention, the system provides information regarding one or more network devices (e.g., reader, antenna, etc.) or their ports to determine their status (e.g., fault), characteristics (e.g., power level), etc. The information may be provided by the network devices themselves, neighboring network devices, or other devices (e.g., sensors) located throughout the network. Based on such information one or more components (e.g., manager unit) may be designated to control the operation of the devices (or the routing of information to such devices) to facilitate ultimate operation of the network.

EXAMPLES

The following descriptions of FIGS. 10-25 illustrate exemplary implementations of preferred embodiments of the invention as applied to an RFID-enabled system.

IntelliNetwork™

The intelligent network in accordance with a preferred embodiment of the invention may be implemented using a network known, in this example, as "IntelliNetwork™," which is a flexible and scalable network of intelligent devices that provide RF signal routing and switching. The names used herein are for exemplary purposes only. An exemplary use of the IntelliNetwork™ is for building RFID systems. One or more RFID readers may be connected into an RF communication network comprising the intelligent devices connected together by RF communication means (for example coaxial cable). RFID signals may thus be communicated from the RFID reader, through the IntelliNetwork™, to one or more antennae. The intelligent devices (or "IntelliDevices™") themselves, besides helping convey the RF signal, also are connected together by a digital data network used for controlling and monitoring the IntelliDevices™.

The intelligent devices include IntelliRouters™, IntelliSwitches™, and IntelliPads™. These devices will be described first, followed by the IntelliManager™ software that controls the intelligent devices.

Preferably, the IntelliNetwork™ devices have several capabilities for facilitating their management and use in a network environment. They may use DHCP Client implementation, that is, the Dynamic Host Configuration Protocol, an Internet protocol for automating the configuration of computers that use TCP/IP communications. They may use SNMP (Simple Network Management Protocol), which has become a de facto standard for Internet work management. The intelligent devices may use DHCP tags, a standard method of communicating certain operating instructions with DHCP. They may also support UART (universal asynchronous receiver-transmitter) communication preferably through the RF connections to discover from neighbor devices the MAC (Media Access Control) address, a standardized hardware address that uniquely identifies each node of a network, usually being assigned specifically to the NIC (network device such as a network interface card) of the device.

When an intelligent device is powered up, its operating system boots a network device, acquires a DHCP IP address, and automatically configures its internal subnet by DHCP and Autosubnet services provided by the IntelliManager™. The devices register themselves automatically by sending an SNMP cold boot notification to the IntelliManager™, so the IntelliManager™ may identify and query the device, obtaining from it information about the network topology that may be displayed on-screen for the user to view, and may be used for setting up RF pathways between readers and antennae.

For network operations, the intelligent devices, particularly the IntelliRouter™, may support Subnet Masking and a routing protocol such as RIP (Routing Information Protocol), OSPF (Open Shortest Path First), IGRP (Interior Gateway Routing Protocol), EIGRP (Enhanced Interior Gateway Routing Protocol), or any other routing protocol.

Boot-Up and Autodiscovery of IntelliDevices™

Figure 10:
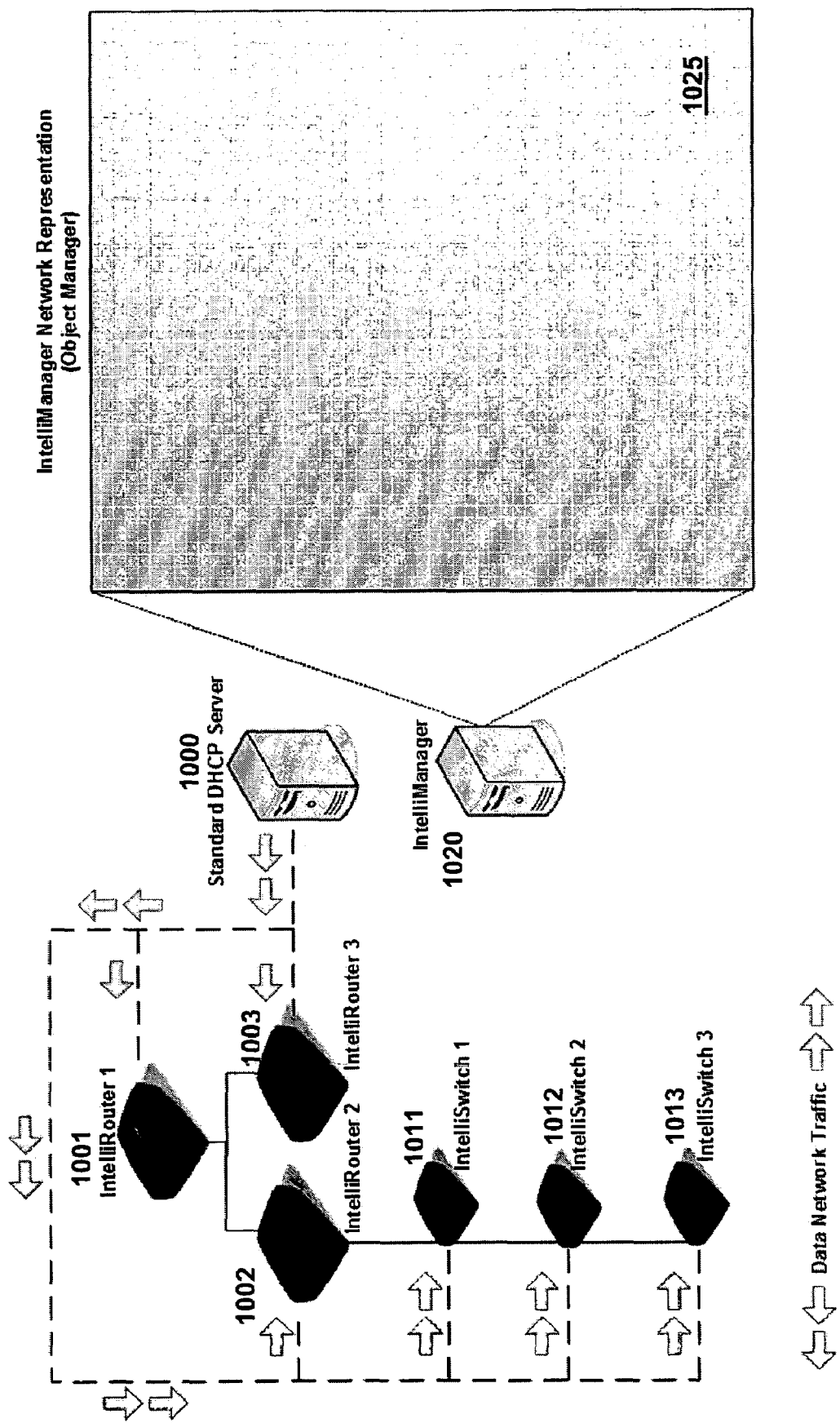
FIGS. 10-13 illustrate schematic representations of an exemplary implementation of a process in accordance with a preferred embodiment of the invention for determining an RF network topology.

FIG. 10 illustrates how, communicating using a standard protocol server such as DHCP Server 1000, a group of intelligent devices boot up after being plugged in, connected to the network, and switched on. Each of the intelligent devices acquires a network Internet Protocol address from the DHCP server 1000. The intelligent devices include an IntelliRouter™ 1 (1001) at a first level, connected to additional IntelliRouters™ 2 and 3 (1002 and 1003) at a second level. Furthermore IntelliRouter™ 2 is connected to a series of three IntelliSwitches™ (1011, 1012, 1013). During this initial IP address acquisition, IntelliManager™ 1020 does not yet have any information about the intelligent devices, so its network map 1025 is blank. As an example, LAN subnets may be allocated to IntelliRouter™ LAN ports.

Figure 11:
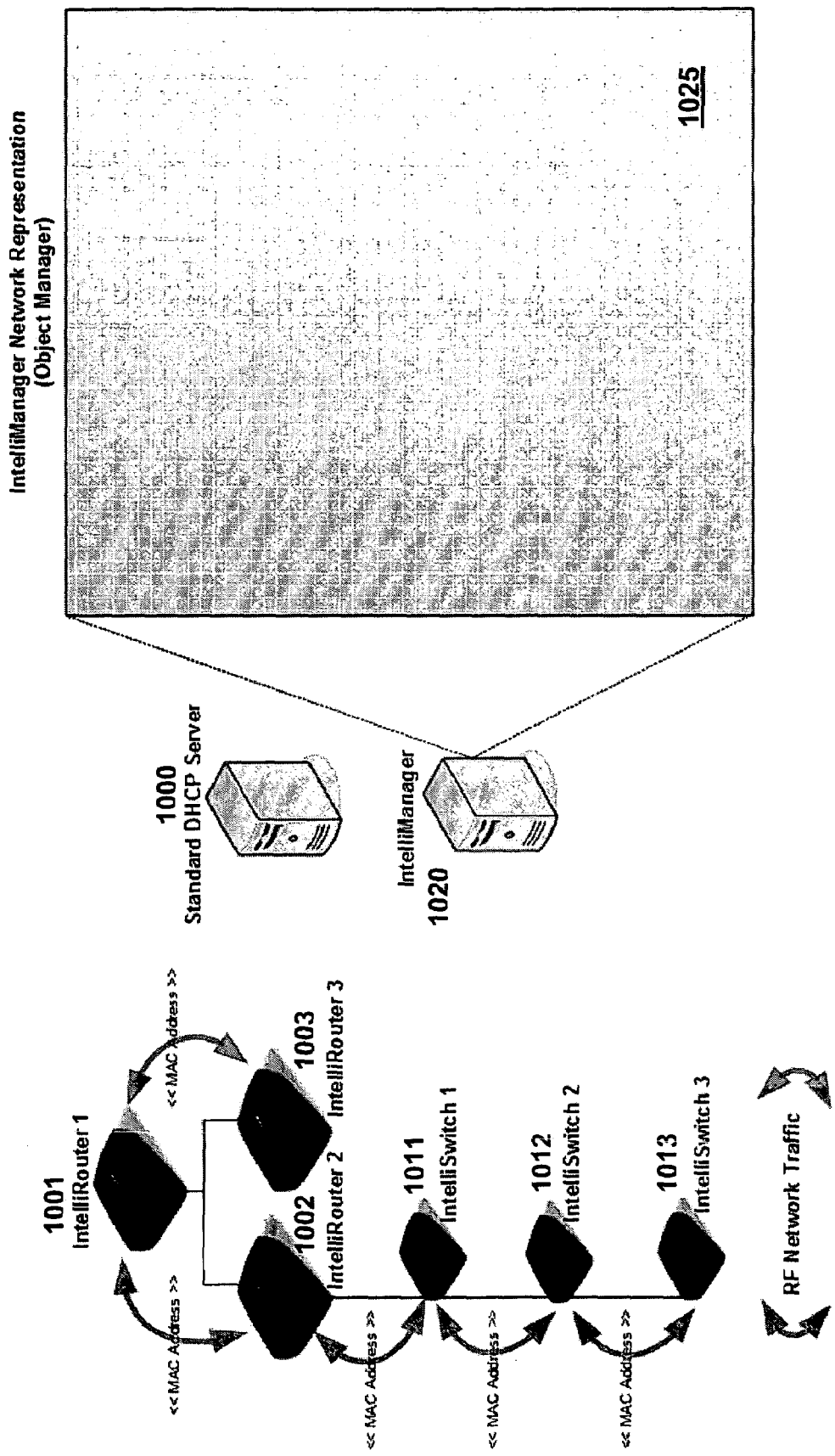

FIG. 11 illustrates how the intelligent devices each attempt to communicate through each of their RF connections (RF input ports and RF output ports). If any other IntelliDevices™ are connected to these ports, then each IntelliDevice™ sends its MAC address to nearby IntelliDevices™, allowing them to discover what IntelliDevices™ they are connected to on the RF network. For example, IntelliRouters™ 1 and 2 (1001 and 1002) swap their MAC addresses, as do all other devices that are interconnected through RF ports.

Figure 12:
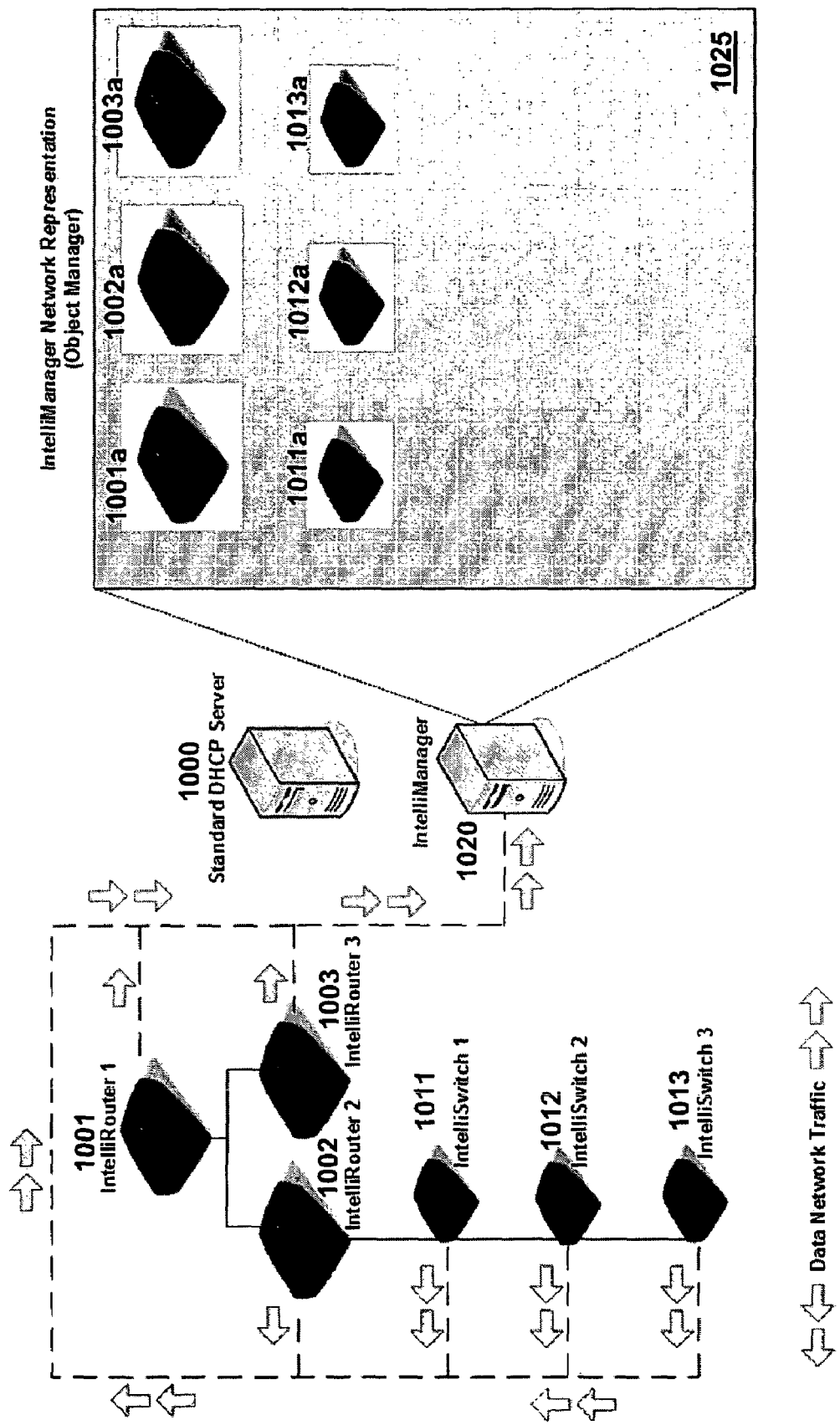

FIG. 12 illustrates how the IntelliDevices™ each send a 'cold boot' SNMP message to the data network to announce their existence to IntelliManager™ 1020, and to announce that they are ready to be queried.

The IntelliManager™ picks up the MAC addresses from the cold boot messages, and creates objects inside the Object Manager to represent the devices. IntelliManager™ stores a list of devices from which it received announcements. The IntelliManager™ list of devices 1025 now contains list objects 1001a, 1002a, 1003a (representing the IntelliRouters™) and list objects 1011a, 1012a, and 1013a (representing the IntelliSwitches™).

Figure 13:
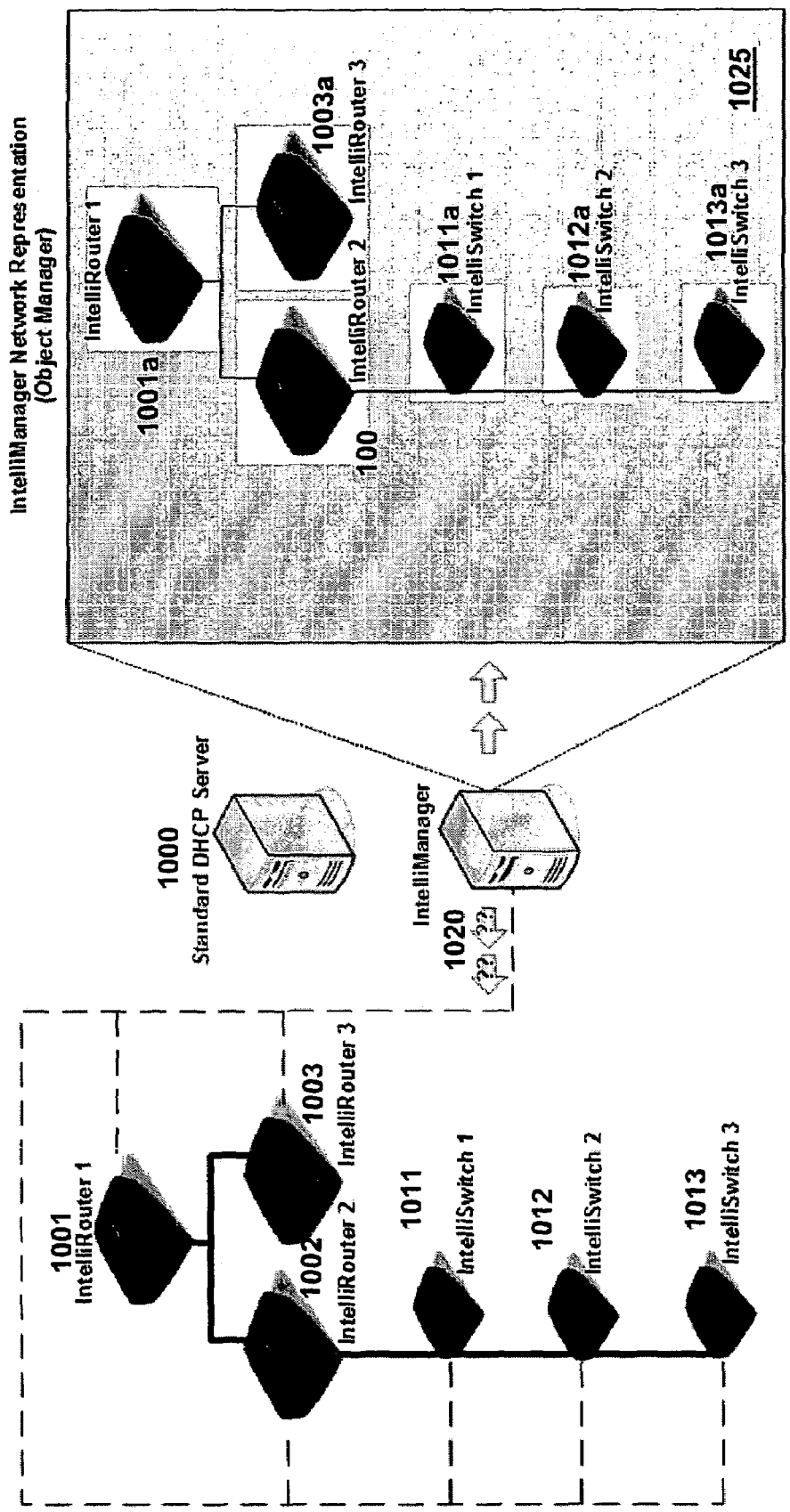

FIG. 13 illustrates how the IntelliManager™ sends a query to each device to get the network topology (neighboring device) information. Each device in turn responds with information about what MAC addresses are connected to its RF ports. The IntelliManager™ builds a representation 1025 of the network topology using the information it receives from the IntelliDevice™ queries. Thus representation 1025 is identical to the RF topology of the IntelliNetwork™. The representation is then used by IntelliManager™ for RF network route planning.

IntelliRouter™

Figure 14:
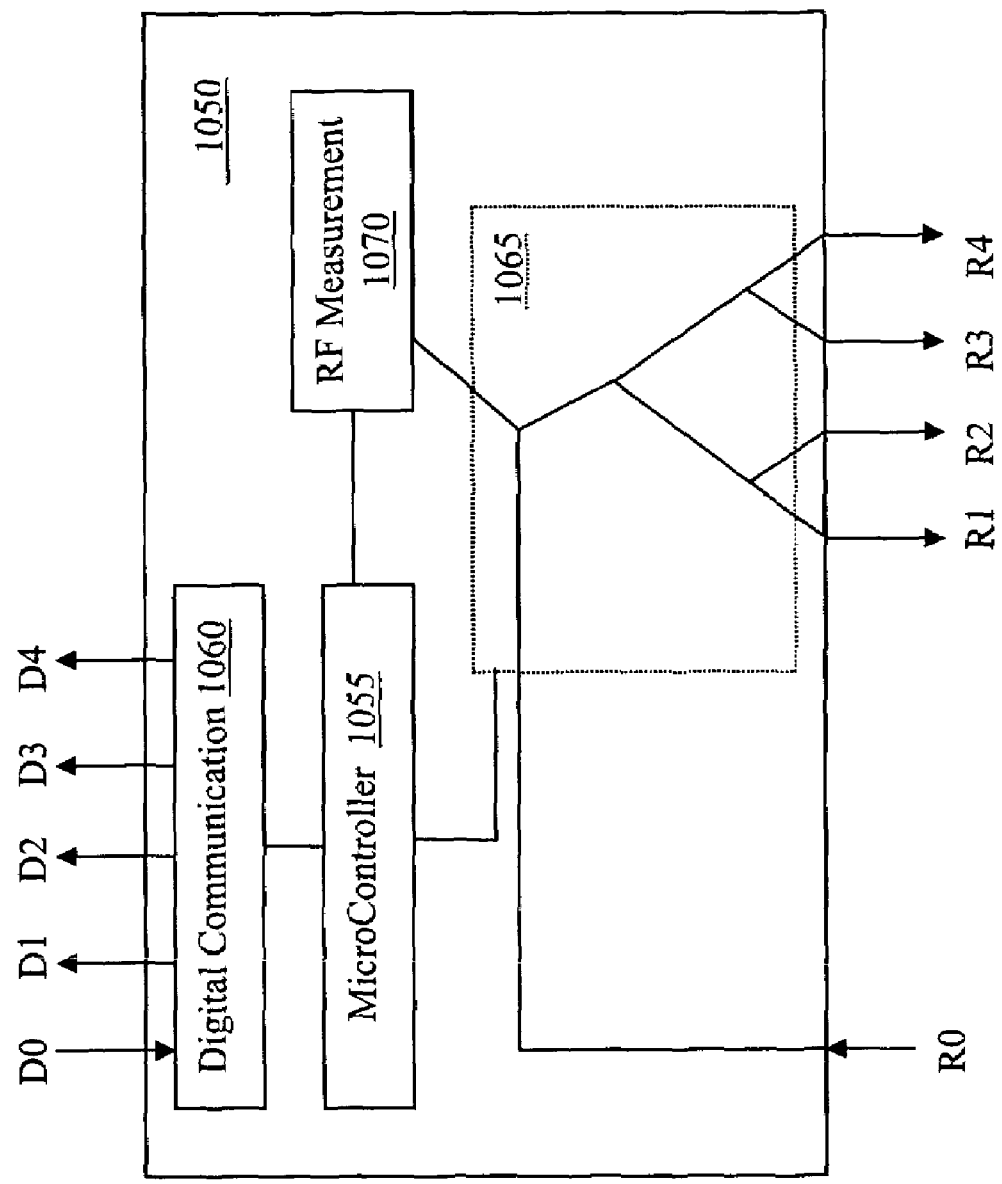
FIG. 14 is a block diagram of an exemplary IntelliRouter™ in accordance with a preferred embodiment of the invention.

FIG. 14 is a simplified block diagram of an exemplary IntelliRouter™ 1050. An IntelliRouter™ is a combination digital data router and RF signal router, or combination router, as described previously herein. The IntelliRouter™ includes a microcontroller 1055, and may be controlled from outside for example by a computer such as a workstation or server, communicating to the IntelliRouter™ by a digital data network comprised of wired or wireless means, such as a standard LAN, MAN, or WAN. Communication may be over the Internet. The IntelliRouter™ may communicate digital data in turn to additional IntelliRouters™ or IntelliSwitches™, or these additional devices may communicate separately via the digital data network. In the example shown, the IntelliRouter™ has a digital communication capability 1060 with an input D0 and four outputs D1-D4. "Input" and "output" are used for convenience in describing the IntelliRouter™; normally D0-D4 may all be bidirectional. It is understood that any suitable number of ports can be used in accordance with preferred embodiments of the invention.

The IntelliRouter™ is capable of automatic setup using standard DHCP protocols and uses a specialized algorithm for address allocation. It can route digital data as network data packets. It uses SNMP as its main command and control language. It supports network communications to IntelliSwitches™ as well as additional IntelliRouters™, or other devices. It is capable of receiving data packets from the IntelliManager™ and routing them in TCP/IP or other serial data formats to an RFID reader, for instance if the RFID reader does not itself support network communications. The IntelliRouter™ has a switch that can be activated manually to send a signal to the IntelliManager™, identifying the particular IntelliRouter™ so that it may be highlighted on a configuration table or graphic to help with field setup or troubleshooting. The IntelliRouter™ monitors itself and its RF signals or connections, and forwards status and diagnostic information to the IntelliManager™.

One of the capabilities of an IntelliRouter™ is its support for the creation and destruction of RF paths through the IntelliRouter™, which is usually used within a network of IntelliRouters™ and IntelliSwitches™. For example, IntelliRouter™ 1050 has one RF input port R0 and four RF output ports R1-R4. The terms "input" and "output" are used in convenience in describing the IntelliRouter™. In a preferred embodiment, R0-R4 may all be bidirectional. RF switching circuitry is provided as shown by the exemplary block 1065, which is meant to be symbolic and not limiting as to the switch circuitry design. The switching circuitry 1065 is under control of microcontroller 1050, which typically follows commands from the IntelliManager™.

The IntelliRouter™ supports neighbor-to-neighbor identification over the RF path through ports R0-R4. The IntelliRouter™ exchanges MAC address (or other form of unique identification) information with its neighbors over the RF paths, and then sends this information to the IntelliManager™ which can construct a map of the RF network.

Each of the IntelliRouter™ outputs may be connected to another IntelliRouter™ or IntelliSwitch™, or may be connected directly to an RFID antenna. The IntelliRouter™ may have circuitry 1070 for measuring the tuning characteristics of RF ports to determine whether an output port should be utilized (i.e. it will not be used if nothing is connected, or if tuning characteristics are outside defined parameters).

The circuitry 1070 may also measure RF power being applied to an RF antenna port, enabling diagnostics to be performed automatically by the IntelliDevice™ or by the IntelliManager™ software. This also enables the IntelliManager™ to adjust the RF power to an appropriate level, for example by sending a command to an RFID reader. The IntelliRouter™ may have additional circuitry (not shown) for measuring such variables as temperature, voltage, current, etc., and capability to report such measurements to the IntelliManager™.

The IntelliRouter™ may also deliver DC power (for example, 300 milliamps at +12V (not shown)) through the RF output ports when instructed to do so by the IntelliManager™ software. This current, for example, may be used to drive circuitry connected to the antenna.

For a typical IntelliRouter™ 1050, the digital communication block 1060 may have one (typically) or more WAN (Wide area network, such as Internet) ports, several (typically four) LAN (Local area network) ports (for connecting to other IntelliRouters™ or IntelliSwitches™), one or more RF Input ports R0 (typically two), several (typically four) RF output ports R1-R4, as well as (not shown) RS232, PS/2, parallel, USB, or other IO ports, and ports for input and output power (with the output power being controlled on demand by the IntelliManager™).

For example, an RFID reader (not shown) may be connected to an IntelliRouter™ input port such as R0, and an antenna (not shown) may be connected to one of its output ports such as R2. However, between the RFID reader and the RF input port R0, or between the RF output port R2 and the antenna, there may be additional IntelliRouters™ and/or IntelliSwitches™. When a given reader is to be connected to a given antenna, the IntelliManager™ route manager passes out instructions to each router and switch on the network via SNMP to create a path for the RF to follow from reader to antenna. As a node on the IntelliNetwork™, each router receives its own individual internal switching commands for its own RF switching circuitry 1065 to correctly set the node on the RF Path. Some of the IntelliRouter™ multiple RF input and output ports R0-R4 may serve either as inputs or outputs.

The router may send out SNMP messages to the IntelliManager™ about the general status of the IntelliRouter™. These messages may, for example, include the following types.

A switch notification when a pushbutton is pressed, to send a message to the IntelliManager™, which may then highlight this device on the GUI network map for use during installations or diagnostics.

A critical voltage notification, sent if the IntelliRouter™ power supply exceeds minimum or maximum limits. The IntelliManager™ is able to set these limits, and to provide a graphical display of any devices out of limits.

An external power supply error notification, sent if the routers' external power supply has a problem (too much current, too little current, etc.). The IntelliRouter™ also supplies power to connected devices such as readers. It may also monitor the power connections to other devices for voltage, current, and other conditions, and can send error notifications to the IntelliManager™ if a malfunction is detected in the power connection or supply.

A temperature alarm, if the maximum allowed temperature has been reached.

An RF output fault notification, when there is an RF signal problem.

An output port disconnected notification, when an output port state is changed from connected to disconnected.

A VSWR limit notification, when an RF port has exceeded the high or low VSWR limit.

A neighbor device output port change notification, when the RF output port neighbor has changed. The IntelliManager™ indicates if the neighbor MAC address is changed or the neighbor device is disconnected.

A neighbor device input port change notification, when the RF input port neighbor has changed. The IntelliManager™ indicates if the neighbor MAC address is changed or the neighbor device is disconnected.

The IntelliRouter™ has the ability to query other RF network devices immediately connected to it. It does this by passing preferably over the RF cable its own MAC address and or the MAC address of the neighbor device.

When a device is connected or removed, it sends an alert to the IntelliManager™ so that the network topology map can be automatically updated.

IntelliSwitch™

Figure 15:
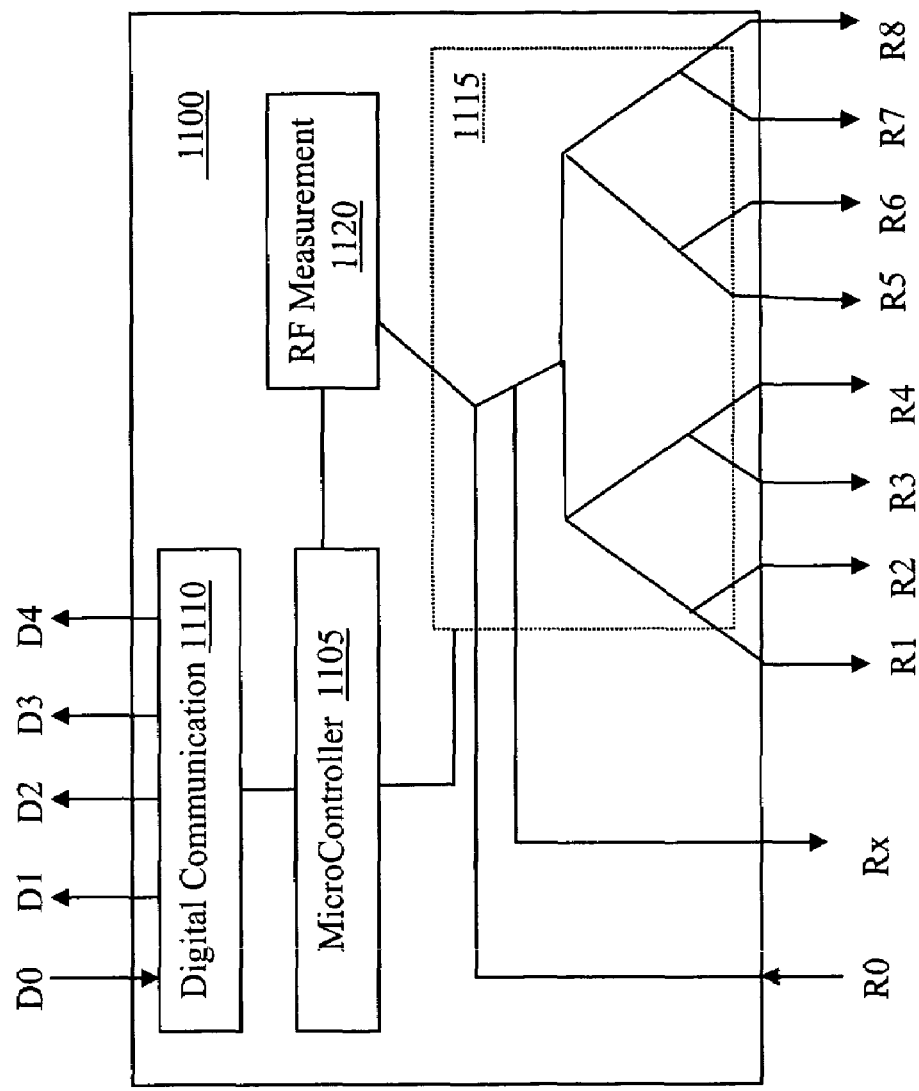
FIG. 15 is a block diagram of an exemplary IntelliSwitch™ in accordance with a preferred embodiment of the invention.

FIG. 15 is a simplified block diagram of an exemplary IntelliSwitch™ 1100. The design, capabilities, and operation of the IntelliSwitch™ are in most respects similar to those of the IntelliRouter™. The IntelliSwitch™ includes a microcontroller 1105, and combines a digital data capability 1110, and RF data switching capability 1115. It may include RF measurement capability 1120. Typically the RF switching may "bypass" the RF signal onto additional IntelliSwitches™ in a daisy-chain fashion, for example connecting RF input port R0 to RF bypass port Rx, or may connect the RF power to one of several RF antennae connected to the IntelliSwitch™, for example connecting RF input port R0 to RF output port R5. Its RF ports are typically one input port R0, one bypass port Rx, and sixteen output or "antenna" ports, shown in this example as ports R1-R8 for simplicity. The invention is not meant to be limited to sixteen ports, but may have fewer or more as appropriate. For example, thirty-two ports may be used. However, the bypass port Rx could lead instead to another IntelliRouter™, and one or more of the output ports R1-R8 could be connected to another IntelliRouter™ or IntelliSwitch™.

IntelliPad™

Figure 16:
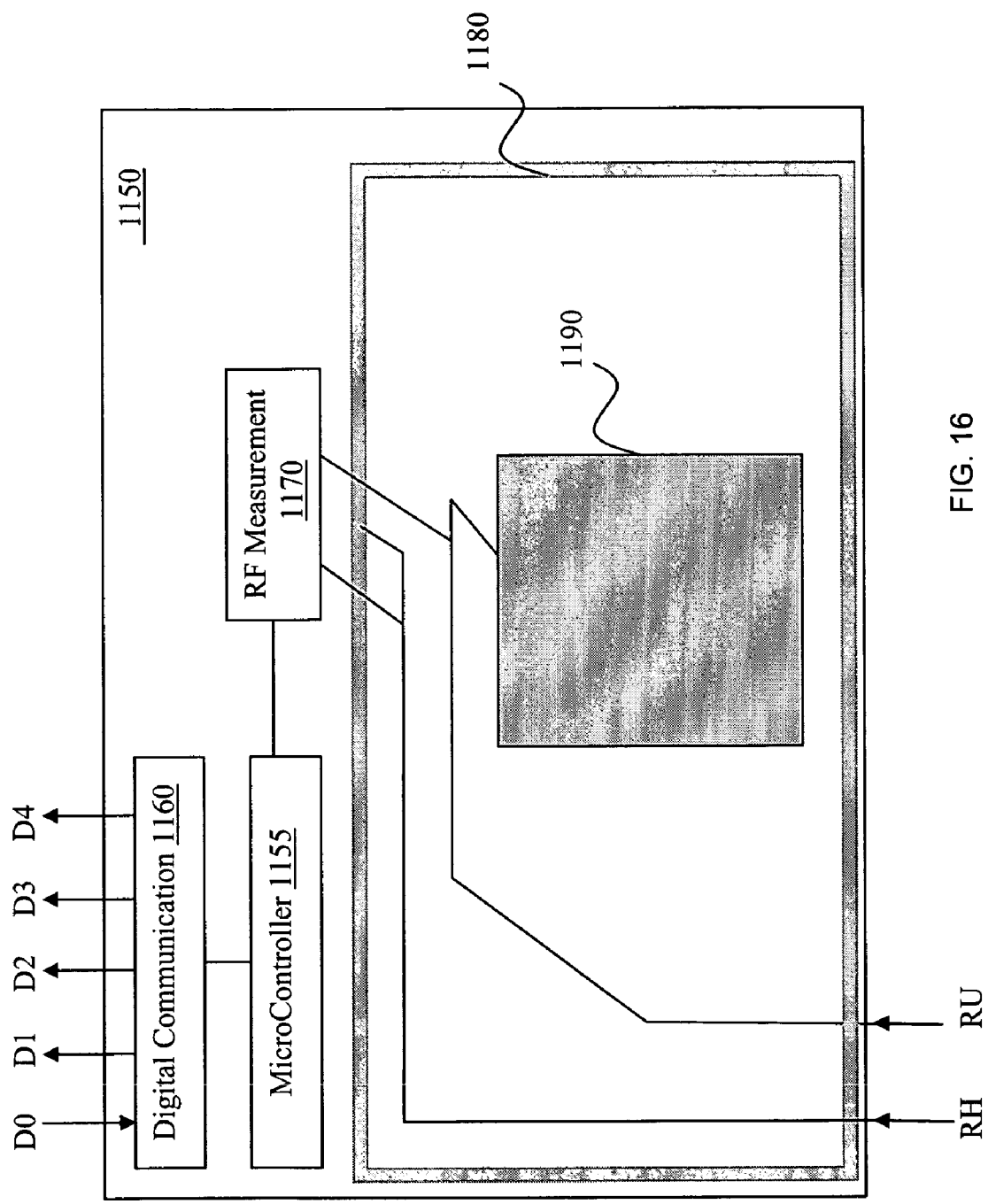
FIG. 16 is a block diagram of an exemplary IntelliPad™ in accordance with a preferred embodiment of the invention.

FIG. 16 shows a simplified block diagram of an exemplary IntelliPad™ 1150. An IntelliPad™ may be considered an alternative version of the low profile pad described in previous U.S. Provisional Patent Application No. 60/466,760, which is incorporated herein by reference in its entirety. An IntelliPad™ may share many of the configuration capabilities of the IntelliRouter™ and IntelliSwitch™, including a microcontroller 1155, digital communications capability 1160, and RF measurement circuitry 1170. The IntelliPad™ also contains one or more antennae, for instance a High Frequency antenna, represented by loop antenna 1180, and an Ultra High Frequency antenna, represented by patch antenna 1190). Thus the IntelliPad™ may be used for reading and writing RFID tags. The IntelliPad™ shown in FIG. 16 includes an HF input port (RH) and an UHF input port (RU) which are connectable to external readers (not shown). The IntelliPad™ may also measure the power/current levels, etc. as other devices can.

The IntelliPad™ can be connected to the IntelliNetwork™ (or an IntelliManager™ or other controller) for control, to an RF reader, and to a barcode scanner gun. The user may read and/or write EPC and barcode information to and from RFID tags that are placed on the IntelliPad™ or scanned via the scanner gun.

The IntelliPad™ is designed to handle "hands-on" work, such as passing RFID tags over the pad surface to perform various inventory management functions. The IntelliPad™ is preferably read on demand when a user places an item on it. Therefore, a reader may be dedicated to the IntelliPad™, or shared by a few IntelliPads™, or the IntelliPad™ may incorporate interrupt-driven events to cause a "read-on-demand." IntelliPad™ transactions include an event notification is raised whenever the user triggers a barcode scanner attached to the IntelliPad™, and a read-on-demand in response to the event notification.

Sensors

The intelligent devices, as described previously, may have sensors (1070, 1120, 1170) for use in determining RF power and allowing control of the RF power remotely, measuring RF transmitted power and/or RF reflected power for determining system connectivity, performance, and tuning measurements, to be used to remotely tune components or to make decisions whether a circuit or an antenna should be used. Centralized RF signal power management is a part of the IntelliNetwork™, allowing antennae at different distances from a reader to still have equal or otherwise optimized power.

The IntelliDevices™ may also have temperature measurement sensors, for example to monitor the proper operation of the IntelliDevice™. Voltage and current measurement sensors may likewise be provided to monitor proper operation of various circuitry. Out-of-limits measurements may be reported to the IntelliManager™.

IntelliManager™ Software

The IntelliNetwork™ is controlled by a software component called the IntelliManager™. This software runs on a computer such as a workstation, or on a server, or both. The IntelliManager™ coordinates automatic discovery and notification as new devices are deployed on the network and provides GUI based configuration of RFID devices for ease of deployment. The IntelliManager™ is able to set and update custom arrangements of products on shelves. The IntelliManager™ also provides measuring and reporting of inventory as determined through the RFID capabilities of the IntelliNetwork™.

The IntelliManager™ maps the network hardware to a site layout for easy recognition of devices. IntelliManager™ also handles automatic RF route management and switching, allowing for sharing of a reader over many antennae, and providing fault tolerant reads in case of an RF reader fail-over or other system problems. Upon receiving the fail-over recognition the IntelliManager™ may automatically redirect requests from the failed or down device or system to other available devices or systems. It incorporates "plug and play" functionality to auto-announce and identify new devices on the network. If the RF reader supports power adjustments, the IntelliManager™ may control the reader output power to provide optimal RF power levels to any antenna, regardless of physical distance from the reader.

Figure 17:
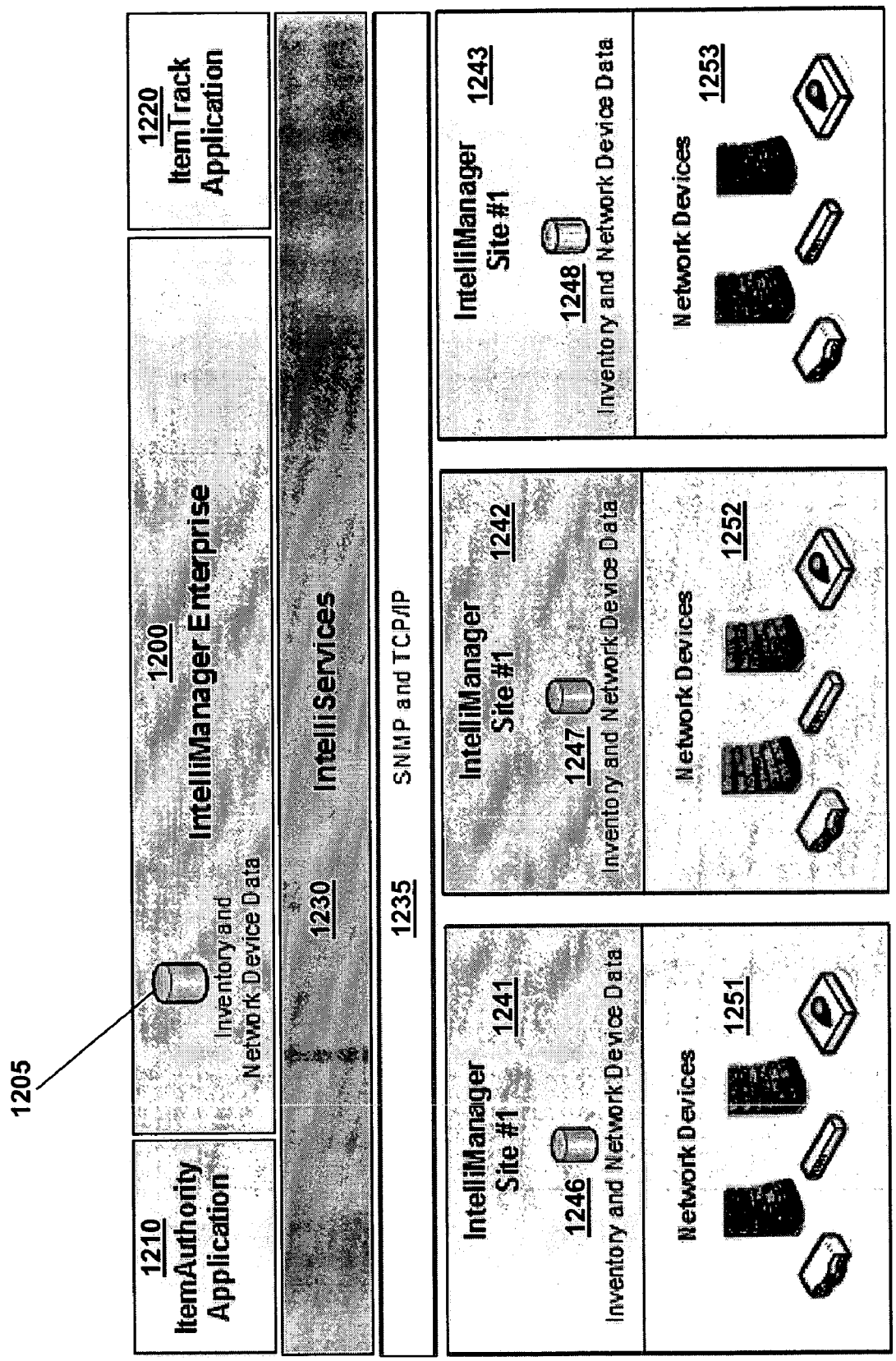
FIG. 17 illustrates an exemplary deployment of Intelli-Manager™ across several sites in accordance with a preferred embodiment of the invention.

FIG. 17 depicts a simplified exemplary deployment of IntelliManager™ across three sites. An "Enterprise" or centralized IntelliManager™ 1200 is shown on a higher level with a database 1205 for inventory data and network configuration information. Also shown at the higher level is "ItemAuthority" software 1210 which manages the distribution and registration of unique EPC numbers, as described, for example, previously in U.S. Provisional Patent Application No. 60/466,760 which is incorporated by reference in its entirety herein. Also shown at the higher level is "ItemTrack" software 1220 for "track-and-trace" functionality as described, for example, in previous U.S. Provisional Patent Application No. 60/545,100, which is incorporated herein by reference in its entirety. Local or site versions of IntelliManager™ 1241, 1242, and 1243 are shown at a lower level, along with databases 1246, 1247, and 1248, respectively, and their collections of network devices 1251, 1252, and 1253, respectively.

Also at a relatively high level in the hierarchy, as shown, for example, in FIG. 17, are the IntelliServices™ 1230, a set of web services providing a variety of functions that are used by the IntelliManager™ at either the Enterprise or Site level, or both. Some of the IntelliServices™ may also open to the third party users. IntelliServices™ 1230 are typically available over the Internet, for example through the SNMP and TCP/IP layer 1235.

Figure 18:
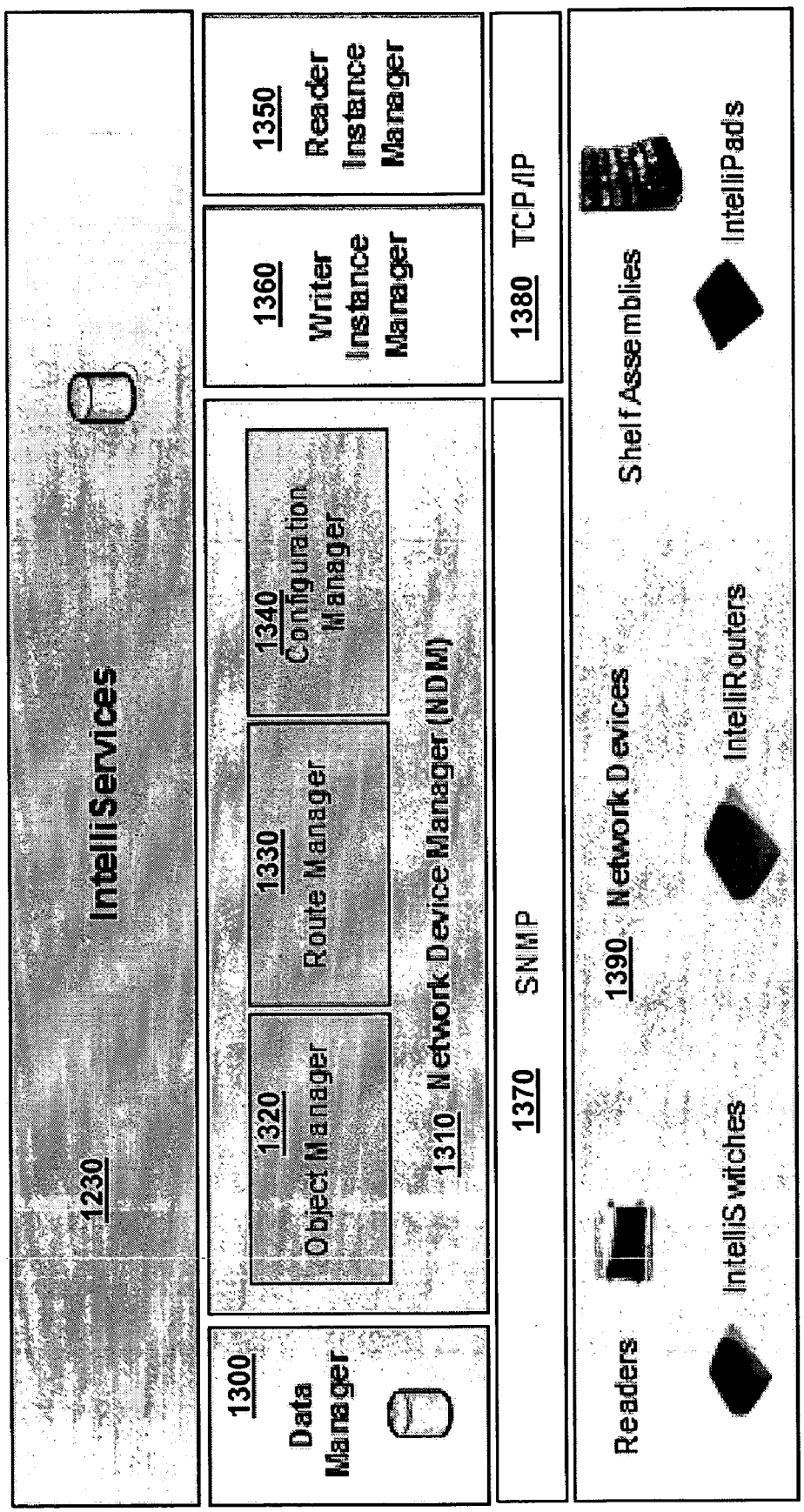
FIG. 18 is a block diagram of hardware and software components in an exemplary implementation of a preferred embodiment.

FIG. 18 shows an exemplary "stack" of hardware and software components as they relate to each other in the IntelliNetwork™.

The IntelliServices™ 1230 are web services and other software that provide a user interface, reporting features, and the ability for third party software to access filtered item-level data. IntelliServices™ also maintain a configuration database used for certain functions of internal IntelliManager™ components (such as the Object Manager 1320 and Route Manager 1330).

Data Manager 1300 contains a database of current and historical data read from RFID tags, as well as some configuration information used for reporting.

The Network Device Manager 1310 consists of three functional parts. Configuration manager 1340 creates a Reader/Writer Instance (program object) for each physical reader in the network, so that the reader may then be controlled through the Instance telling the reader when to turn on and when to turn off, while the Instance receives RFID data from the reader and passes it to the Data Manager 1300.

Route Manager 1330 determines RF routes that exist between readers and antennae, and chooses a route from an RF reader to each antenna that it serves. The Route Manager also frees up the switched paths after each use, and synchronizes the activity of multiple readers for the most efficient operation.

The Object Manager 1320 is responsible for the discovery of new network devices 1390, and maintains status and configuration information for all devices, including interconnection information. It provides an exemplary software 'network diagram' used by the Route Manager to determine RF routes.

Reader Instance Manager 1350 and Writer Instance Manager 1360 send requests to the Route Manager 1330 requesting an RF path from a reader to a specific antenna, allowing use of a reader for multiple antennae by networking connections from one antenna to another.

The SNMP interface 1370 sends commands to all network devices using the Simple Network Management Protocol, an industry standard method of controlling and monitoring networked devices. Communications with TCI/IP (1380) may be used in some cases, for example, between a Reader Instance and a reader. Network Devices 1390 include RF Readers, as well as IntelliRouters™, IntelliSwitches™, IntelliPads™, and shelf assemblies with antenna configurations tailored to the actual fixtures (shelves, storage racks, bins, etc).

Figure 19:
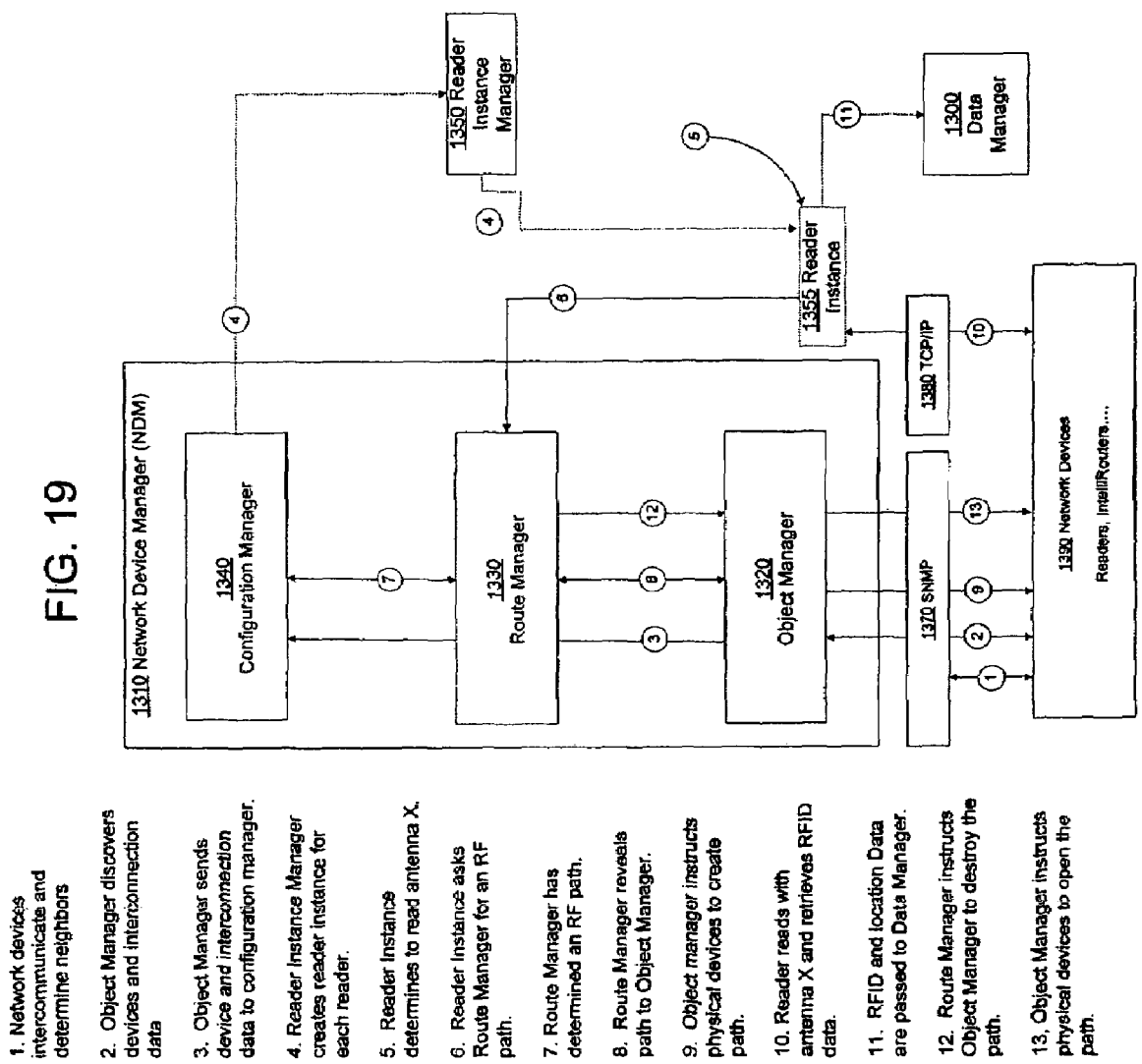
FIG. 19 is a block diagram illustrating an RFID Read Process in accordance with an exemplary implementation of a preferred embodiment.

FIG. 19 shows a block diagram of certain interactions of the Network Device Manager 1310 that pertain to reading tags. The NDM handles communications to IntelliNetwork™ devices including IntelliRouter™, IntelliSwitch™, and IntelliPad™. When an IntelliManager™ starts up, the NDM will request from the IntelliServices™ 1230 any information that has been stored about previously discovered devices. However, the NDM also provides active device discovery through the IntelliNetwork™. At startup, the routers and switches are detected (discovered) as described previously, as depicted by arrows (1) and (2). Each device determines its neighboring devices, and transfers this information to the NDM (arrow 3). During operation the NDM continues to monitor the devices to be aware of any new devices added to the IntelliNetwork™, or any devices that become disconnected. Besides maintaining device discovery information, the NDM also provides commands to the IntelliNetwork™ devices to cause RFID data to be read by the system.

The Route Manager 1330 acts as a traffic controller managing the available routes between readers and antennae. It 'intelligently' determines and maps the most efficient method of routing RF from a reader to any desired antenna which can be connected to that reader. After the read process is complete for the antenna, the Route Manager releases the path to make other pathways available for the next antennae to be read. The Route Manager synchronizes multiple readers so that they may read simultaneously in the most efficient manner.

The Object Manager 1320 controls discovery of new devices on the network, and for each device, maintains a record of current status and all necessary device information. When the IntelliNetwork™ powers up, and during its operation, the Object Manager oversees an auto-discovery process. Individual devices methodically communicate with each other to determine their neighboring devices, and then communicate this information to the Object Manager, a process which results in automatic device discovery and network mapping. The system literally knows how devices are connected to each other across the RF network.

Thereafter, the Object Manager 1320 holds a representation of every physical device on the IntelliNetwork™, along with a table or map of the interconnections between devices. The Route Manager 1330 consults this table or map to determine an RF route to connect a reader to an antenna. This diagram is also used to provide graphical representations of the IntelliNetwork™ during system configuration.

As shown by arrow 4, the Configuration Manager 1340 instructs the Reader Instance Manager 1350 to creates a Reader Instance 1355 (a software representation of a reader) for each physical reader in the network, and sends setup information to the reader instance. Thereafter, the Reader Instance controls the reader, telling the reader when to turn on and when to turn off. The turn on/turn off sequence is synchronized with several other factors—first the IntelliRouters™ and IntelliSwitches™ must create an RF path to a desired antenna. Then the reader may be turned on and instructed to read all tags in view. After the IntelliManager™ determines that all tag data has been collected, the reader is turned off, and the RF path through the IntelliRouters™ and IntelliSwitches™ is "destroyed" (the switched paths are opened).

The Reader instance manager 1350 first sends configuration data to each reader instance 1355, (also step 4) indicating which antennae to read and when to read them. Each reader instance then may operate autonomously as denoted by arrow 5. In step 6 the reader instance asks the Route Manager 1330 to provide an RF path from the reader to a specific antenna. Each instance thus may direct its reader's attention toward multiple antennae in sequence (zone sets), while the Route Manager arranges for RF connections to be made to the desired antenna. The Route Manager initially creates a table of routes, then updates this table as needed, for example if RF connections are changed. The Route Manager may cooperate (step 7) with the configuration manager 1340 for this and other operations. When a reader instance requests an RF path, the Route Manager having determined a suitable path then in step 8 tells the Object manager 1320 what path is needed. In step 9 the Object Manager sends instructions through SNMP layer 1370 to network devices 1390, instructing the network devices on how to set up the RF path. In step 10, the Reader Instance 1355, in control of its reader (not shown) via TCP/IP 1380 or other protocol, performs an RFID read operation for all tags within range of the antenna. The reader instance receives back the EPC data, and in step 11 passes it on to the Data Manager. It may also instruct the reader to turn off or go to standby.

Figure 20:
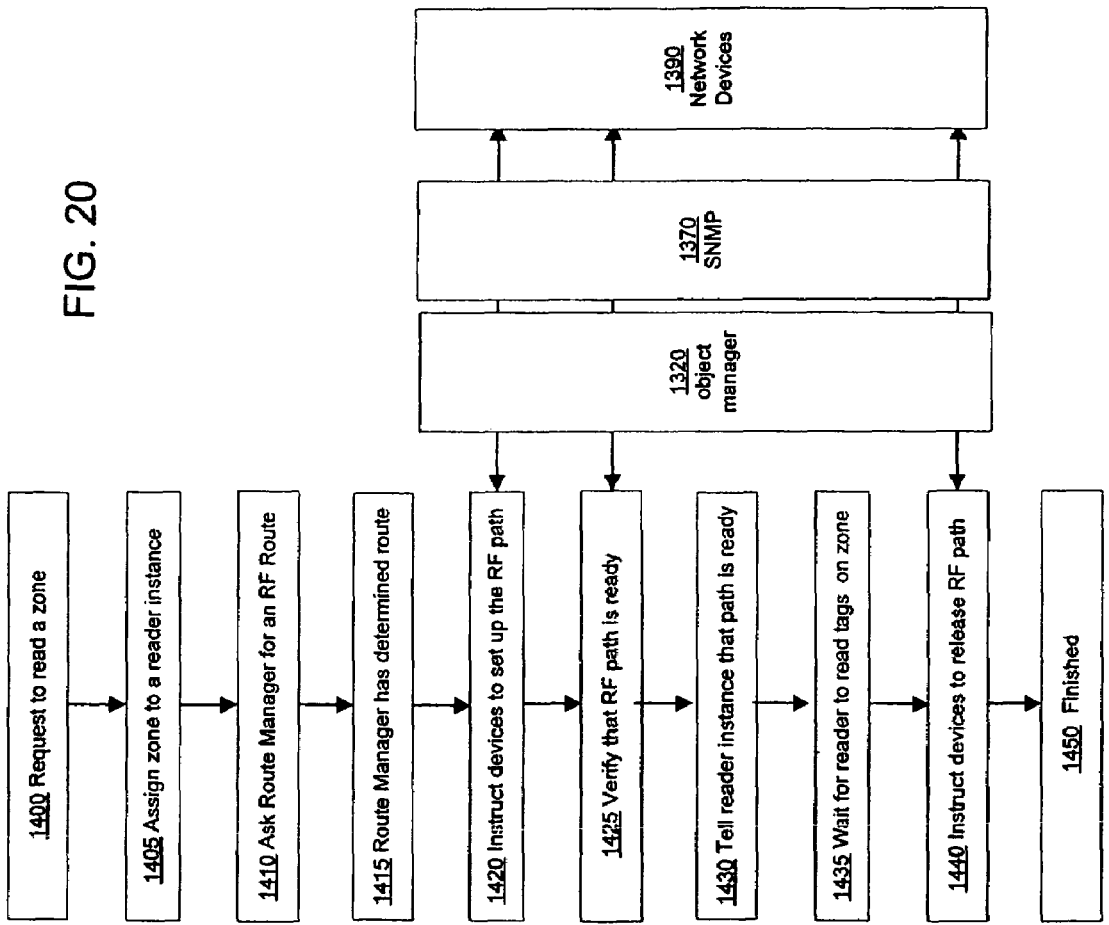
FIG. 20 is a flow chart of a Read process in accordance with an exemplary implementation of a preferred embodiment.

FIG. 20 shows a flow chart of a read operation, which starts in step 1400 with a request to read a zone (that is, a space served by a particular antenna or antennae). This zone is assigned in step 1405 to a particular reader instance (or it may have been previously assigned). In step 1410 the Reader Instance asks the Route Manager for a path to the antenna.

In step 1415, the Route Manager determines (or has already determined) an appropriate RF path between the reader being used, and the specified antenna. In step 1420 the network devices are instructed to set up the RF path. These instructions and several which follow are passed through object manager 1320, and SNMP layer 1370, to the Network devices 1390.

SNMP commands are sent to each IntelliDevice™ along the RF path, indicating which ports to connect to create the path. The IntelliRouter™(s) and IntelliSwitch™(es) create the requested path to the antenna. In step 1425, a verification is made that the path has been set correctly. In step 1430, the reader instance is informed that the path is ready, at which time the reader is given a read command. In step 1435, the read occurs, with the RF signal traveling through the created RF pathway. Tag data, received back to the reader, is passed to the Reader Instance and from there to the Data Manager.

In step 1440, the Reader Instance Manager having finished the read, sends a path destruction request to the Route Manager, which in turn sends SNMP disconnect commands to IntelliDevices™ on the path. The IntelliRouters™ and IntelliSwitches™ along the path route the SNMP commands. The path is destroyed, and in step 1450 the read is finished and the IntelliDevices™ are available for another read.

Zone Management

Figure 21:
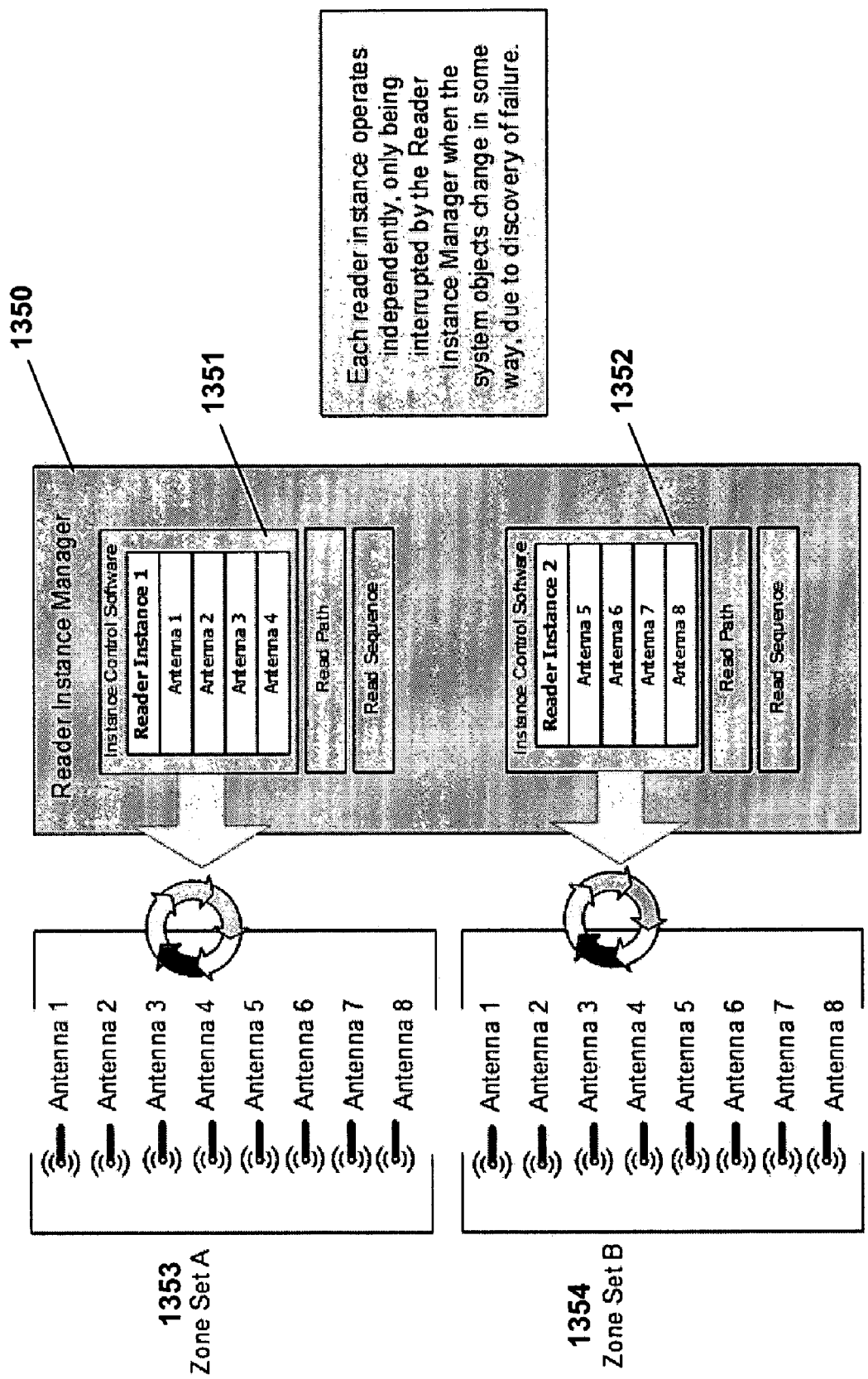
FIG. 21 is a block diagram of a Reader Instance Manager in accordance with an exemplary implementation of a preferred embodiment.

FIG. 21 shows a block diagram of two reader instances each reading a different set of zones. Reader instance 1350 has, in the example, created two reader instances 1351 and 1352. Reader instance 1351 is assigned to read a zone set 1353 comprised of eight antennae, while reader instance 1352 is assigned to read a zone set 1354 also comprised of eight antennae. The reader instances, each with its own reader, may operate independently, while the Route Manager provides the RF paths and prevents path contention (e.g., signals competing for the same path).

Figure 22:
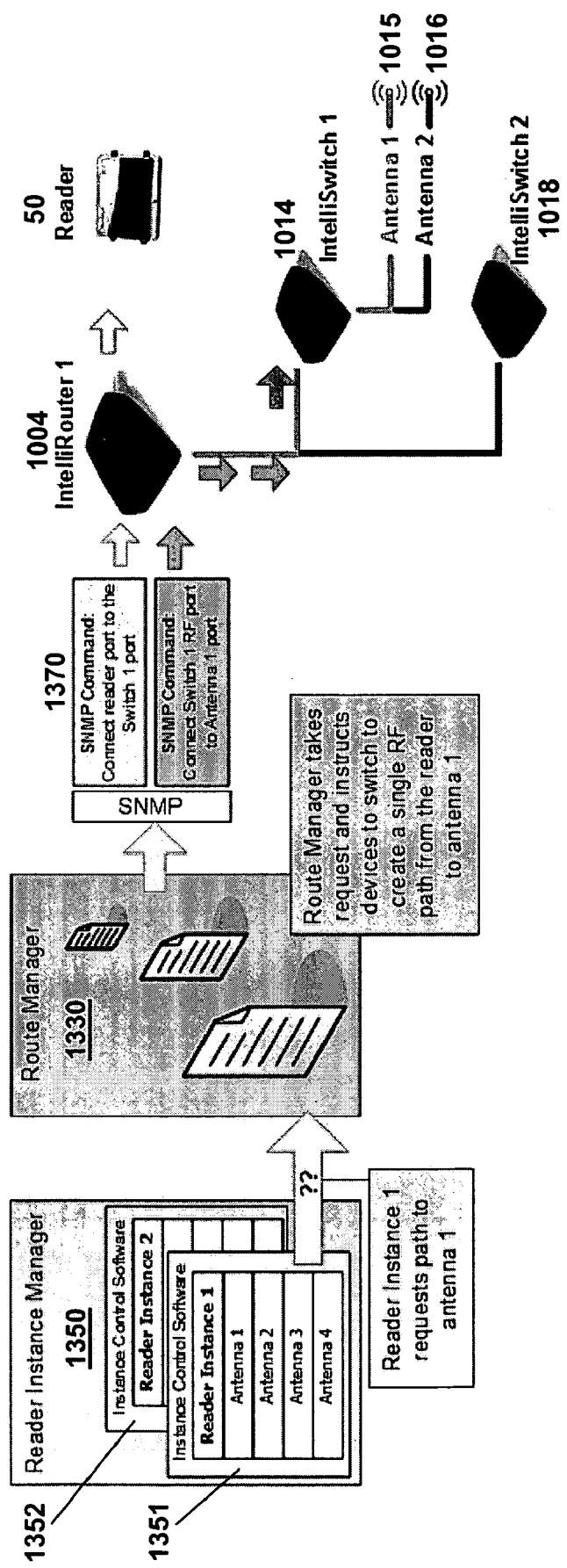
FIG. 22 illustrates the creation of an RF path in accordance with an exemplary implementation of a preferred embodiment.

FIG. 22 shows a block diagram illustrating RF path creation. Reader instance manager 1350 again is shown with two reader instances 1351 and 1352. In the example, reader instance 1351 requests an RF path to antenna 1015. The Route manager 1330 on receiving the request sends instructions through the SNMP layer 1370 to the devices that it has determined to be on the RF path, that is, IntelliRouter™ 1004 and IntelliSwitch™ 1014. The appropriate circuits are set within these devices to create an RF path from Reader 50, through IntelliRouter™ 1004, through IntelliSwitch™ 1014, and then to Antenna 1015.

Figure 23:
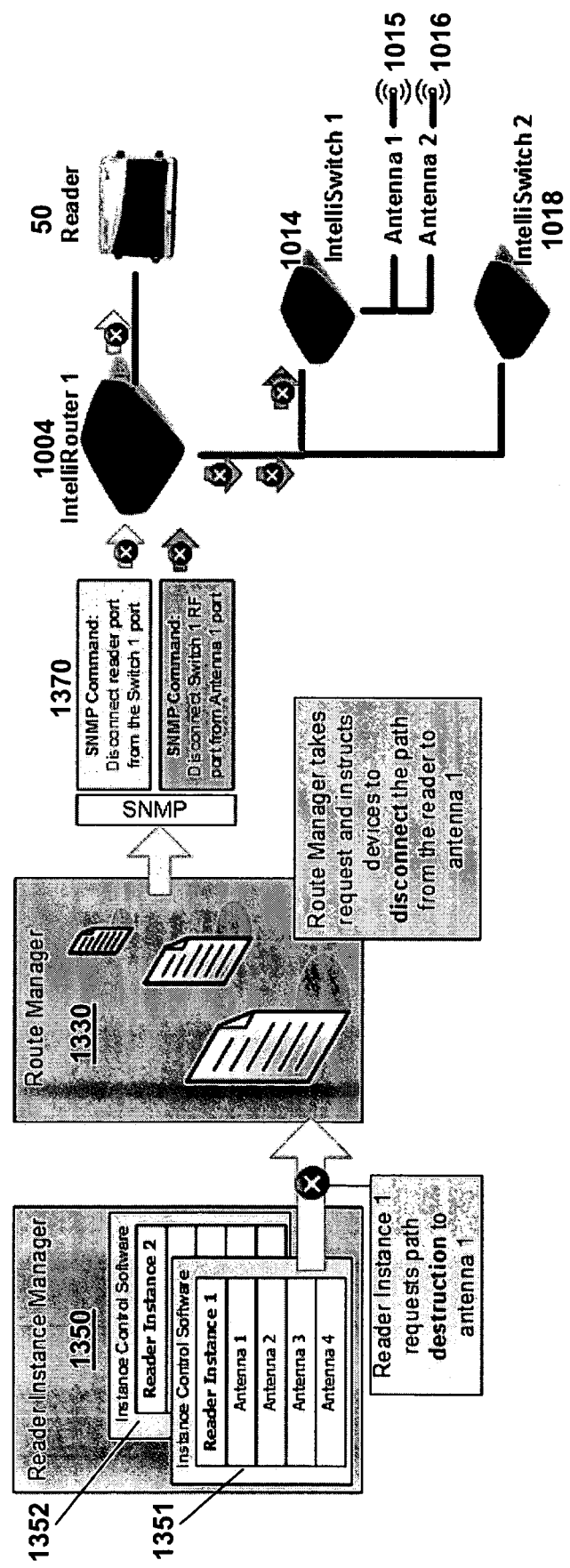
FIG. 23 illustrates the destruction of an RF Path in accordance with an exemplary implementation of a preferred embodiment.

FIG. 23 shows a block diagram illustrating RF path destruction. When the reader instance 1351 finishes with reading antenna 1015, it requests that the RF path to antenna 1015 be released. The Route manager 1330 on receiving the request sends instructions through the SNMP layer 1370 to the devices on the RF path, that is, IntelliRouter™ 1004 and IntelliSwitch™ 1014. The appropriate circuits are released within these devices to "destroy" the RF path that was just used. The devices are then ready for another read request.

Figure 24:
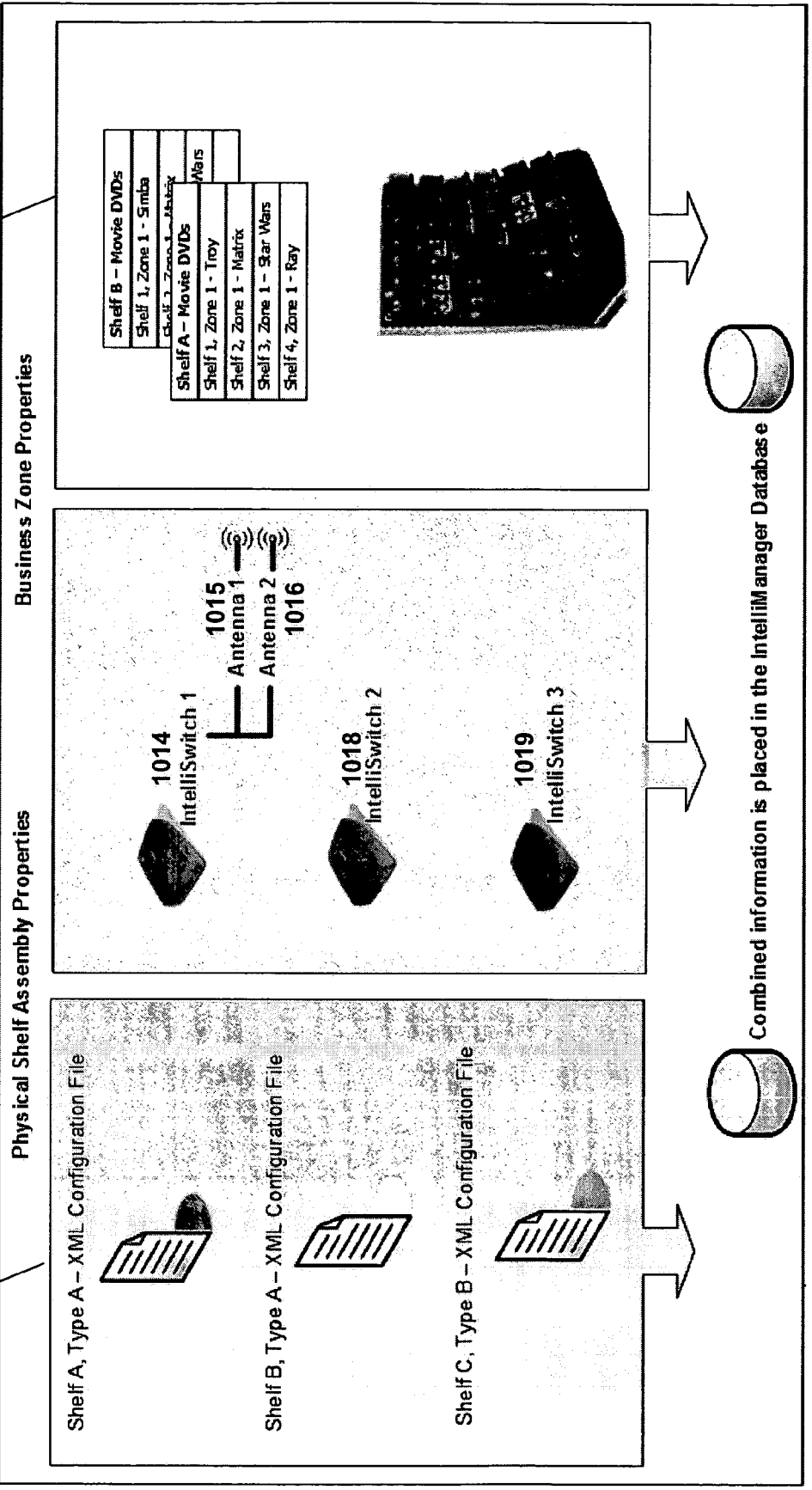
FIG. 24 is a block schematic illustration of an exemplary implementation of a preferred embodiment of the invention.

A graphical user interface (GUI) permits user to view the IntelliNetwork™ through a representation of "real world" devices. For example, as shown in FIG. 24, configuration files 1500 such as XML files define the physical layout of a site such as a retail store, down to the shelf and zone level. During configuration of the system, the user defines which devices (such as IntelliRouters™ (not shown), IntelliSwitches™ (1014, 1018, 1019), Antennae (1015, 1016), etc, are associated with display fixtures such as shelves in a store. The IntelliManager™ provides a GUI representation 1510 so that the user may view the configuration and inventory results in a format (display fixtures, shelves) familiar to them, rather than as an electrical diagram.

Fault reporting supported in IntelliManager™ captures problems that prevent reading item level tags. For example, IntelliManager™ supports a set of notifications that let it detect problems specifically affecting tag reading. More importantly, because of the mapping of antennae to specific hardware, IntelliManager™ is able to apply business context to the errors that are received. For example, where an EMS is able to report a fault with a specific device, the IntelliManager™ is able to provide a layer of context that shows which particular physical shelf assembly and products currently on the shelf (such as DVDs) are affected by the fault.

During installation, the ports of the IntelliRouters™ and IntelliSwitches™ are mapped to the actual ports and antennae of the shelf assemblies. At installation, the shelf assemblies are mapped to the IntelliRouter™ and IntelliSwitches™ to which they are connected.

When messages from the network devices arrive, the system is able to show the faults on the IntelliManager™ user interface in the form of color-coded network device faults, as well as showing the shelves affected by the faults.

Figure 25:
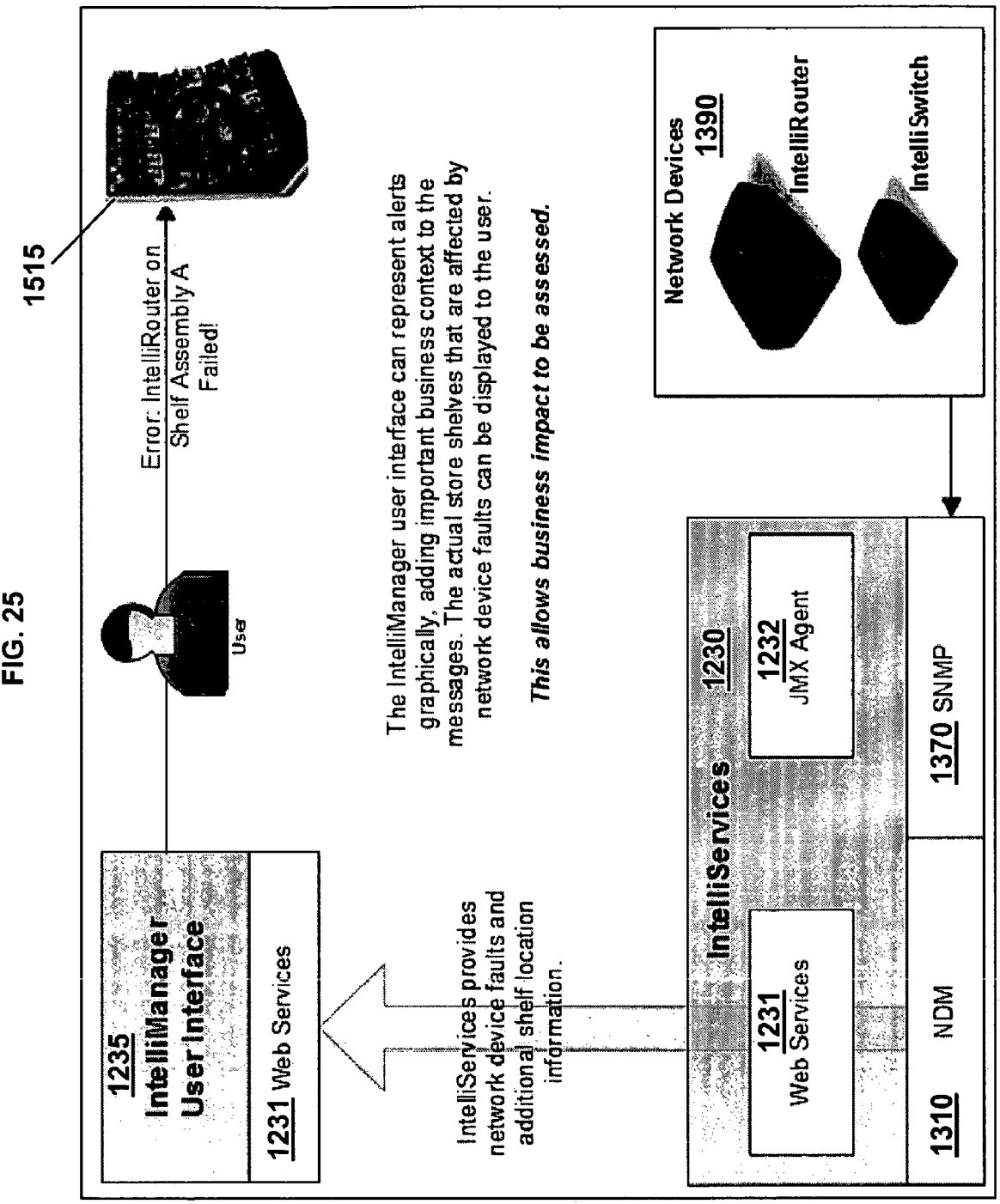
FIG. 25 illustrates the response of an IntelliManager™ to faults on the network in accordance with an exemplary implementation of a preferred embodiment of the invention.

FIG. 25 illustrates how any faults on the network devices 1390 are reported through the SNMP layer 1370, and the Network Device Manager 1310, up through IntelliServices™ 1230 (including web services 1231). The fault notifications arrive at the IntelliManager™ GUI 1235 which can display them to a user in "real-world" fashion 1515, for example, showing exactly which gondola, shelf, or zone is faulty.

A zone management interface handles the configuration of the antenna network to provide the user with the ability to control the way individual zones operate. The antennae of item level shelf assemblies are by necessity close to each other, to be able to give an accurate location resolution for each item. Because shelf designs and product types are different sizes and shapes depending on the application (DVD shelves are one size, music CDs another), the density of antennae may also change. When the antennae are very close to each other, it is possible, due to the nature of the RF field, for more than one antenna to power and interrogate the same passive tag as the read cycle progresses. For example, if three antennae were powering and reading a single tag, the system would show the same product in three different zones. To correct this inaccuracy IntelliManager™ applies sophisticated filtering algorithms at the reader instance level. The reader instance will often read multiple zones before sending the resulting read data on to the Network Device Manager.

The user is able to increase accuracy by sampling the read data multiple times before confirming that the product reporting at that location is accurate. The IntelliManager™ user interface provides sampling and read threshold controls the user can adjust, allowing control over the sampling process. For example, with Samples per Read set to 5 and Hits per Read set to 4, the reader instance will read the zone 5 times one after the other, capturing the product reported at the zone. Any of the item level products that are reported at least 4 times, are reported as present to the data manager.

Related Zones are described in U.S. Provisional Patent Application No. 60/568,847 which is incorporated by reference in its entirety herein. Related zones describe which antennae are close to each other and may be able to read the tags of a zone nearby. Each assembly configuration will include some obvious internal related zones but may not include less obvious related zones on separate shelf assemblies or shelves. The user is able to select a zone and then mark which zones are considered related by selecting two assemblies and associating them with each other.

Hot zones may also be defined, which are represented by a zone that will be read more often than another zone. In a given reader cycle, each zone is by default read with equal priority. It is possible within the application to specify that a zone is read more than once per cycle.

Inventory Reporting—Replenishment

As the customers in the store take goods from the shelf, the store staff uses the replenishment report to identify which products need to be gathered from the back room. It also informs them where in the front of the store to place these items to bring the shelves to full inventory. Because of the graphical interpretation, it is easy to see what parts of the store are affected.

In accordance with a preferred embodiment, other kinds of electrical power (e.g., direct current (DC)) may be used by the antenna system in addition to (or substitution for) RF power. For example, direct current (DC) may be used by the gondola controller 30, as well as by the shelf controllers 40$a$, etc. and the antenna boards 20. One or more dedicated wires may provide such electrical power, or it may be incorporated into the digital communication highway or with an RF cable. An RF cable may be configured using two conductors (e.g., coaxial cable), wherein both the center conductor and the sheath conductor are utilized in the system. While the RF cable carries an RF signal, a DC voltage may be superimposed on the RF signal, in the same RF cable, to provide DC power to intelligent stations. Voltage regulators may subsequently be used to control or decrease excessive voltages to within usable limits. The RF and data communications could also be combined into a single cable that would carry the RF and digital data. This combination could be accomplished by converting the digital data into an RF signal that is at a frequency that does not interfere with the RFID reader. The RF signal could then be received by the routers and converted back into the digital data stream. The RF, data, and power lines could also all be combined into a single communication channel.

While preferred embodiments of the invention have been described and illustrated, it should be apparent that many modifications to the embodiments and implementations of the invention can be made without departing from the spirit or scope of the invention. Any combination of the router or switching functionality in between a reader and antenna can be used in accordance with preferred embodiments of the invention. Any number of the same or combination of different antenna systems or structures (e.g., loop, serpentine, slot, etc., or variations of such structures) may be implemented on an individual shelf, antenna board, shelf back, divider or other supporting structure.

Although embodiments have been described in connection with the use of a particular exemplary shelf structure, it should be readily apparent that any shelf structure, rack, etc. (or any structure) may be used in selling, marketing, promoting, displaying, presenting, providing, retaining, securing, storing, or otherwise supporting an item or product or used in implementing embodiments of the invention.

Although specific circuitry, components, or modules may be disclosed herein in connection with exemplary embodiments of the invention, it should be readily apparent that any other structural or functionally equivalent circuit(s), component(s) or module(s) may be utilized in implementing the various embodiments of the invention.

The modules described herein, particularly those illustrated or inherent in, or apparent from the instant disclosure, as physically separated components, may be omitted, combined or further separated into a variety of different components, sharing different resources as required for the particular implementation of the embodiments disclosed (or apparent from the teachings herein). The modules described herein, may, where appropriate (e.g., reader 50, primary controller 100, inventory control processing unit 130, data store 140, combination routers 600, 601, 602, logical unit 605, data router 610, RF router 650, etc.) be one or more hardware, software, or hybrid components residing in (or distributed among) one or more local and/or remote computer or other processing systems. Although such modules may be shown or described herein as physically separated components (e.g., data store 140, inventory processing unit 130, primary controller 100, reader 50, gondola controller 30, shelf controller 40$a$, 40$b$, 40$c$, etc.), it should be readily apparent that the modules may be omitted, combined or further separated into a variety of different components, sharing different resources (including processing units, memory, clock devices, software routines, etc.) as required for the particular implementation of the embodiments disclosed (or apparent from the teachings herein). Indeed, even a single general purpose computer (or other processor-controlled device such as an Application Specific Integrated Circuit (ASIC)), whether connected directly to antennae 10, antenna boards 20, gondolas 70, or connected through a network 120, executing a program stored on an article of manufacture (e.g., recording medium such as a CD-ROM, DVD-ROM, memory cartridge, etc.) to produce the functionality referred to herein may be utilized to implement the illustrated embodiments.

One skilled in the art would recognize that inventory control processing unit 130 could be implemented on a general purpose computer system connected to an electronic network 120, such as a computer network. The computer network can also be a public network, such as the Internet or Metropolitan Area Network (MAN), or other private network, such as a corporate Local Area Network (LAN) or Wide Area Network (WAN), Bluetooth, or even a virtual private network. A computer system includes a central processing unit (CPU) connected to a system memory. The system memory typically contains an operating system, a BIOS driver, and application programs. In addition, the computer system contains input devices such as a mouse and a keyboard, and output devices such as a printer and a display monitor. The processing devices described herein may be any device used to process information (e.g., microprocessor, discrete logic circuit, application specific integrated circuit (ASIC), programmable logic circuit, digital signal processor (DSP), MicroChip Technology Inc. PICmicro® Microcontroller, Intel Microprocessor, etc.).

The computer system generally includes a communications interface, such as an Ethernet card, to communicate to the electronic network 120. Other computer systems may also be connected to the electronic network 120. One skilled in the art would recognize that the above system describes the typical components of a computer system connected to an electronic network. It should be appreciated that many other similar configurations are within the abilities of one skilled in the art and all of these configurations could be used with the methods and systems of the invention. Furthermore, it should be recognized that the computer and network systems (as well as any of their components) as disclosed herein can be programmed and configured as an inventory control processing unit to perform inventory control related functions that are well known to those skilled in the art.

In addition, one skilled in the art would recognize that the "computer" implemented invention described herein may include components that are not computers per se but also include devices such as Internet appliances and Programmable Logic Controllers (PLCs) that may be used to provide one or more of the functionalities discussed herein. Furthermore, while "electronic" networks are generically used to refer to the communications network connecting the processing sites of the invention, one skilled in the art would recognize that such networks could be implemented using optical or other equivalent technologies. Likewise, it is also to be understood that the invention utilizes known security measures for transmission of electronic data across networks. Therefore, encryption, authentication, verification, and other security measures for transmission of electronic data across both public and private networks are provided, where necessary, using techniques that are well known to those skilled in the art.

Moreover, the operational flow and method shown in, and described with respect to, FIG. 9, for example, can be modified to include additional steps, to change the sequence of the individual steps as well as combining (or subdividing), simultaneously running, omitting, or otherwise modifying the individual steps shown and described in accordance with the invention. Numerous alternative methods may be employed to produce the outcomes described with respect to the preferred embodiments illustrated above or equivalent outcomes.

It is to be understood therefore that the invention is not limited to the particular embodiments disclosed (or apparent from the disclosure) herein, but only limited by the claims appended hereto.

What is claimed as new and desired to be protected by Letters Patent of the United States is:

1. A network for transporting RF data and digital signal data, the network comprising:
   a plurality of network devices for receiving and communicating signals over the network, wherein each network device has a unique address, wherein the plurality of network devices includes:
   a plurality of RFID antennae assemblies, each RFID antennae assembly including a plurality of RFID antennas;
   two combination routers that each have the capability of processing command data signals and facilitating the transporting of both the RF data and the digital signal data, including command data signals, and wherein the at least two combination routers each further includes at least two bidirectional RF input ports, at least two bidirectional digital input ports, at least two bidirectional RF output ports and at least two bidirectional digital output ports, and further including logic, responsive to certain command data signals, for dynamically switching certain RF data between one of the bidirectional RF input ports and one of the bidirectional RF output ports, and certain digital signal data between one of the bidirectional digital input ports and one of the bidirectional digital output ports;
   an RFID reader connected to one of the bidirectional RF input ports of each of the two combination routers for receiving read RF data from various ones of the plurality of RFID antennas through different RF routes, each of the different RF routes including one of the two combination routers, and wherein the RFID reader can further translate the read RF data into read digital data signals; and
   a manager unit for controlling the network and for coordinating identification and notification of the plurality of network devices, including the plurality of RFID antennas, the at least two combination routers and the RFID reader, wherein the manager unit ensures that appropriate connections occur between each of the plurality of RFID antennas and the RFID reader at appropriate times to establish the RF routes.

2. The network of claim 1, further comprising:
   a protocol server for assigning protocol addresses to activated ones of the plurality of network devices.

3. The network of claim 1, wherein the manager unit queries each activated network device to determine a network topology and maps the network topology to a site layout to recognize network devices.

4. The network of claim 1, wherein the manager unit comprises:
   a configuration manager for controlling activation/deactivation of the RFID reader;
   a route manager for determining and selecting the RF routes between the RFID reader and each of the plurality of RFID antenna, wherein the route manager tears down selected routes after use; and
   an object manager for discovering new network devices on the network, and for maintaining status and configuration of such network devices.

5. The network of claim 4, wherein the manager unit provides fault notification.

6. The network of claim 5, wherein the fault notification comprises a fail-over recognition.

7. The network claim of 6, wherein upon receiving the fail-over recognition the configuration manager automatically redirects requests from a failed or down device or system to other available devices or systems.

8. The network of claim 1, wherein each activated one of the plurality of network devices identifies neighboring active network devices and provides information of such neighboring devices to the manager unit.

9. The network of claim 8, wherein each of the combination router exchanges protocol address information with a neighboring network device and sends the information of such neighboring device to the manager unit.

10. The network of claim 1, wherein at least one of the plurality of network devices includes sensors for at least one of: determining RF power; allowing remote control of RF power of the network device; and measuring RF forward and RF reverse power for determining system connectivity, performance and tuning measurements.

11. The network of claim 1 further including another RFID reader, the another RFID reader being connected to one of the bidirectional RF input ports of each of the two combination routers for receiving some of the read RF data from various ones of the plurality of RFID antennas through the different RF routes, each of the different RF routes including one of the two combination routers, and wherein the another RFID reader can further translate the read RF data into read digital data signals.

12. The network of claim 11 wherein at least one of the combination routers, when switching configurations to establish another RF route, similarly switches both an RF data path and a digital data path within the at least one combination router to facilitate the transporting of both the RF data and the digital signal data.

13. The network of claim 11 further including a third combination router, the third combination router having the capability of processing command data signals and facilitating the transporting of both the RF data and the digital signal data, including command data signals, and wherein the third combination router further includes at least two bidirectional RF input ports, at least two bidirectional digital input ports, at least two bidirectional RF output ports and at least two bidirectional digital output ports, and further including logic, responsive to certain command data signals, for dynamically switching some certain RF data between one of the bidirectional RF input ports and one of the bidirectional RF output ports, and some certain digital signal data between one of the bidirectional digital input ports and one of the bidirectional digital output ports.

14. The network according to claim 13 wherein one of the bidirectional RF input ports of the third combination router is connected to one of the bidirectional RF output ports of each of the two combination routers, and one of the bidirectional digital input ports of the third combination router is connected to one of the bidirectional digital output ports of each of the two combination routers.

15. The network of claim 1 further including a third combination router, the third combination router having the capability of processing command data signals and facilitating the transporting of both the RF data and the digital signal data, including command data signals, and wherein the third combination router further includes at least two bidirectional RF input ports, at least two bidirectional digital input ports, at least two bidirectional RF output ports and at least two bidirectional digital output ports, and further including logic, responsive to certain command data signals, for dynamically switching some certain RF data between one of the bidirectional RF input ports and one of the bidirectional RF output ports, and some certain digital signal data between one of the bidirectional digital input ports and one of the bidirectional digital output ports.

16. The network according to claim 15 wherein one of the bidirectional RF input ports of the third combination router is connected to one of the bidirectional RF output ports of each of the two combination routers, and one of the bidirectional digital input ports of the third combination router is connected to one of the bidirectional digital output ports of each of the two combination routers.

17. The network of claim 15 wherein at least one of the combination routers, when switching configurations to establish another RF route, similarly switches both an RF data path and a digital data path within the at least one combination router to facilitate the transporting of both the RF data and the digital signal data.

18. The network of claim 1 wherein at least one of the combination routers, when switching configurations to establish another RF route, similarly switches both an RF data path and a digital data path within the at least one combination router to facilitate the transporting of both the RF data and the digital signal data.

19. The network of claim 1, wherein the plurality of network devices include at least one antenna controller disposed between some of the plurality of RFID antennas and one of the combination routers.

20. The network of claim 1 wherein the at least one antenna controller is connected to one of the bidirectional digital output ports and one of the RFID digital output ports, such that the antenna controller receives some of the digital data and can transmit some certain RF data to the one combination router.

21. The network of claim 20 wherein the one combination router, when switching configurations to establish an RF route with the at least one antenna controller, similarly switches both an RF data path and a digital data path within the one combination router to facilitate the transporting of both the RF data and the digital signal data.

22. The network of claim 20 wherein the at least one antenna controller is a shelf controller.

* * * * *